United States Patent [19]

Kirino et al.

[11] Patent Number: 5,858,548
[45] Date of Patent: Jan. 12, 1999

[54] SOFT MAGNETIC THIN FILM, AND MAGNETIC HEAD AND MAGNETIC RECORDING DEVICE USING THE SAME

[75] Inventors: Fumiyoshi Kirino, Tokyo; Shigeharu Otomo, Sayama; Nagatugu Koiso; Noriyuki Kumasaka, both of Tokyo; Takeshi Miura, Hitachinaka, all of Japan

[73] Assignee: Hitachi, Ltd., Tokyo, Japan

[21] Appl. No.: 509,584

[22] Filed: Jul. 31, 1995

[30] Foreign Application Priority Data

Aug. 12, 1994 [JP] Japan .................................. 6-190694
Sep. 14, 1994 [JP] Japan .................................. 6-220585

[51] Int. Cl.$^6$ .................................................. G11B 05/31
[52] U.S. Cl. .......................... 428/457; 428/692; 428/900; 420/28; 420/103; 252/62.55; 148/300; 148/304; 148/306; 148/307; 148/308; 148/309
[58] Field of Search .................... 148/300, 304, 148/306, 307, 308, 309; 428/457, 692, 900; 420/28, 103, 127; 252/62.55; 360/126

[56] References Cited

U.S. PATENT DOCUMENTS

| 5,104,464 | 4/1992 | Hasegawa ............................. 148/300 |
| 5,117,321 | 5/1992 | Nakanishi et al. ..................... 360/120 |
| 5,154,983 | 10/1992 | Watanabe ............................ 428/611 |
| 5,176,806 | 1/1993 | Hasegawa .......................... 204/192.11 |
| 5,244,627 | 9/1993 | Katsuki .................................. 420/127 |
| 5,386,332 | 1/1995 | Jagielinski et al. ................... 360/126 |
| 5,411,813 | 5/1995 | Zeltser .................................. 428/606 |
| 5,474,624 | 12/1995 | Suzuki et al. ......................... 148/121 |
| 5,478,416 | 12/1995 | Takaoka et al. ....................... 148/306 |

FOREIGN PATENT DOCUMENTS

| 59-035660 | 2/1984 | Japan . |
| 1-017850 | 1/1989 | Japan . |
| 2-275605 | 11/1990 | Japan . |
| 3-20444 | 1/1991 | Japan . |

*Primary Examiner*—Stevan A. Resan
*Attorney, Agent, or Firm*—Fay, Sharpe, Beall, Fagan, Minnich & McKee

[57] ABSTRACT

Corrosion resistance of a magnetic film composed mainly of Fe is maintained while keeping its magnetic properties. A magnetic head having a magnetic core is formed in part of the magnetic thin film, which contains not only an alloy of Fe-metalloid series but also (Al, Ru) or (Al, Rh) and which is thermally treated at a constant temperature to develop the soft magnetic properties. The deterioration of the saturation magnetization and the soft magnetic properties is suppressed by adding (Al, Ru) or (Al, Rh) together. The magnetic film has a high saturation magnetization and excellent soft magnetic properties and is excellent in corrosion resistance and hardness.

16 Claims, 3 Drawing Sheets

SOFT MAGNETIC THIN FILM, AND MAGNETIC HEAD AND MAGNETIC RECORDING DEVICE USING THE SAME

FIELD OF THE INVENTION

The present invention relates to a small crystal separating type soft magnetic film and, more particularly, to a soft magnetic thin film having high performance and high reliability, and a magnetic head and a magnetic recording unit manufactured with the soft magnetic thin film.

The present invention also relates to a magnetic film, which has a high saturation magnetization, a high permeability and a low magnetostriction constant and which has excellent corrosion resistance and hardness properties which is suitable for a head core material for a magnetic disc device or a VTR.

BACKGROUND OF THE INVENTION

In accordance with the developments of recent years, there is a need for small-sized and highly dense memories. For example, such memory needs are required for magnetic recording units, which are designed with high density magnetic recording and downsizing development objectives. For realizing the high density recording objective, it is necessary to provide a recording medium having a highly coercive force sufficient for the minute magnetic domains that are recorded to stably exist, and a high-performance magnetic head formed from a material capable of achieving such recording on the medium. In order to magnetize the highly coercive medium sufficiently for recording the signals, it is necessary to use a magnetic head material having a high saturation magnetization capable of establishing an intense magnetic field. This magnetic material has conventionally been a Co-series amorphous alloy, an FeAlSi series (Sendust) alloy or the like.

At present, the magnetic material proposed to have such a high saturation magnetization is exemplified by an Fe—C alloy or an Fe—N alloy. These magnetic materials are subjected to a heat treatment at a constant temperature in an inert gas flow of argon or nitrogen, while being exposed to a magnetic field of about 3 to 10 KOe, if necessary, so that the soft magnetic properties may be developed. In case the magnetic head is the metal-in-gap (MIG) type head, its manufacturing process includes a glass bonding step at a bonding temperature that determines the temperature of the heat treatment. Since the soft magnetic properties of the magnetic film depend upon the small sized crystal grains to separate out, the crystal grain size has to be controlled in order to form a magnetic film having excellent soft magnetic properties. Moreover, since, these magnetic materials are composed mainly of Fe, they react with oxygen and moisture in the atmosphere to produce hydroxides or oxides that cause the magnetic properties to fluctuate, especially the coercive force and/or saturation magnetization properties. Accordingly, the performance of the magnetic head deteriorates.

When a magnetic head formed of the aforementioned magnetic material is used in practice, it is necessary to suppress fluctuations in its magnetic properties. As a result, magnetic alloys have been proposed that contain a relatively large concentration of C, as expressed by a composition formula of Fe(Ti, Zr, Hf, Nb, Ta, Mo, W)C, and as disclosed in Japanese Patent Laid-Open No. 20444/1991, or a relatively large concentration of Fe(Zr, Hf, Ti, Nb, Ta, V, Mo, W)N, as disclosed in Japanese Patent Laid-Open No. 275605/1991.

SUMMARY OF THE INVENTION

In order to achieve a balance between the saturation magnetization and the soft magnetic properties, and especially between the coercive force and the corrosion resistance of a magnetic film suitable for use in magnetic recording/reading, the following considerations have been taken into account, according to the present invention. If the corrosion resistance is retained, for example, the magnetic properties, especially the saturation magnetization and the coercive force deteriorate so that the performance (e.g., the saturation magnetization) inherent in the Fe—C or Fe—N material cannot be realized and the performance of the magnetic head decreases. For example, in the case of recording, errors or noises may be caused that prevent high density recording. If the magnetic properties are retained, on the other hand, sufficient corrosion resistance may not be retained and it may be difficult to prevent the reliability of the magnetic head from being degraded. Also, with the addition of various elements to the alloys, moreover, the saturation magnetization tends to decrease, or the magnetostriction constant tends to increase. As a result, satisfactory recording cannot be ensured, or the output waveforms at the time of reading will be deformed so that problems are caused in the recording/reading characteristics.

The magnetic films of the Co series amorphous alloy and the FeAlSi series alloy have a saturation magnetization of 1.1 to 1.3 T, whereas the magnetic films of the aforementioned carbon series or nitrogen series alloy have a saturation magnetization as high as 1.6 to 1.6 T. However, the evaluations of the corrosion resistance have been conducted to reveal that the carbon or nitrogen series alloy magnetic films face problems in corrosion resistance. Specifically, it has been determined that corrosion occurs in the process for fabricating the magnetic head or is liable to occur in some portion of the head when moisture condenses on the surface of the magnetic head or when the head is exposed to an atmosphere having chloride ions.

An object of the present invention is to provide a soft magnetic thin film having high performance and high reliability. Sufficient corrosion resistance is attained according to the invention by providing a magnetic film composed mainly of Fe and having a high saturation magnetization that retains its magnetic properties. Also, a magnetic head and a magnetic recording unit having high performance and reliability that is manufactured using the soft magnetic thin film is provided according to the invention.

A soft magnetic thin film formed according to a first embodiment of the present invention contains mainly Fe; at least one element selected from the group consisting of Ta, Hf, Ti, Nb and Zr, within a range of 5 to 20 at. %, preferably within 5 to 15 at. %; at least one element selected from the group consisting of C, B, Si and N, within a range of 1 to 20 at. %, preferably within a range of 5 to 15 at. %; and two additional elements, one being Al and the other one being selected from the group consisting of Rh and Ru, within a range that prevents the soft magnetic properties from being deteriorated. The Al to be added is within 0.5 to 10 at. %, and the Ru or Rh is within 0.5 to 5 at. %. At this time, the sum of Al and Ru or Rh is within a range of 1 to 15 at. %, preferably within a range of 3 to 15 at. %.

The reasons it is believed that the content of at least one element selected from the group consisting of Ta, Hf, Ti, Nb and Zr is set within a range of 5 to 20 at. % are as follows. If the selected element is less than 5 at. %, then the α-Fe will abruptly grow so that the coercive force will increase over 1 Oe which is unsuitable for magnetic head core material applications. If the selected element is in excess of 20 at. %, the magnetic film turns non-magnetic so that it is also unsuitable for the magnetic head material. Incidentally, within a range of 5 to 15 at. %, it is preferable that the coercive force drops to 1 Oe or less, and that the permeability $\mu$ takes a value $\mu \geq 1,000$. In the magnetic film according to the present invention, the Ta, Hf, Ti, Nb and Zr have similar effects not only in magnetic properties but also in corrosion resistance.

At least one element of the group consisting of C, B, Si and N is contained within a range of 1 to 20 at. %. This is because the α-Fe abruptly grows for less than 1 at. % so that the coercive force exceeds 1 Oe. In excess of 20 at. %, on the other hand, the magnetic film turns non-magnetic so that it is not suitable for the magnetic head material. Incidentally, a range of 5 to 15 at. % is preferable because the coercive force becomes lower than 1 Oe, and the permeability $\mu$ takes a value $\mu \geq 1,000$. In the magnetic film according to the present invention, the C, B, Si and N have similar effects not only in magnetic properties but also in corrosion resistance.

The reason why the Al is contained within a range of 0.5 to 10 at. % is that the magnetic film has its magnetic properties improved for less than 0.5 at. % but cannot retain the corrosion resistance and that in excess of 10 at. %, a deterioration of the saturation magnetization and an abrupt increase of the magnetostriction constant results.

The reason why the Ru or Rh is contained within a range of 0.5 to 5 at. % is that the effect of adding the Al is enhanced for less than 0.5 at. % to increase the magnetostriction and that in excess of 5 at. %, an abrupt drop of the permeability $\mu$ to less than 1,000 results. Moreover, the reason why the sum of Al and Ru or Rh is within a range of 1 to 15 at. % is that the magnetic film does not retain its corrosion resistance when the sum is less than 1 at. % and its magnetic properties abruptly deteriorate when the sum exceeds 15 at. %. Incidentally, a range of 3 to 15 at. % is preferable partly because the magnetic properties, especially the magnetostriction constant can be confined within a practical range and partly because the corrosion resistance can be retained. In the magnetic film of the present invention, the Ru and Rh have similar effects not only in the magnetic properties but also in corrosion resistance.

According to this first embodiment of the present invention, the magnetic film can realize the magnetic properties including a saturation magnetization of not less than 1.4 T necessary for the high density recording, a coercive force of not more than 1 Oe necessary for excellent operations (e.g., recording/reading) when used in a magnetic head, a relative permeability of not less than 1,000, and a magnetostriction constant of not more than $5 \times 10^{-6}$ necessary for excellent operations when used in an information reading head.

Further, according to this first embodiment of the present invention, the soft magnetic thin film can be controlled to have the above-specified desired magnetic properties by controlling the concentrations of the Al and Ru (or Rh) to be added. In this case, the increase of the Al will improve not only the corrosion resistance but also the magnetostriction constant. On the other hand, the increase of the Ru or Rh to be added will improve the corrosion resistance but will deteriorate the magnetic properties such as the coercive force by promoting the growth of the magnetostriction constant. However, the change in the magnetostriction constant according to the increase of the concentration of the addition of Ru or Rh can be made smaller than that of the case in which Al is solely added. By adding these two elements simultaneously, therefore, the corrosion resistance can be highly improved while suppressing the change in the magnetic properties to the minimum. By controlling the ratio between the Al and Ru (or Rh) to be added, more specifically, the magnetic film can have its magnetic properties controlled within a desired range and its corrosion resistance improved. It is preferable that the concentration ratio Al/Ru between the Al and Ru or the concentration ratio Al/Rh between the Al and Rh, as expressed in at. %, be within a range of 1 to 5.

In the magnetic film of the above-specified alloy, the small crystals can separate out to develop the soft magnetic properties by applying a heat treatment. The magnetic film after this heat treatment is preferred to have an X-ray diffraction peak and to have an average crystal grain size of no more than 10 nm in the Fe phase. In this crystallization by the heat treatment, the growth of the Fe phase can be suppressed by adding the Al and Ru (or Rh) to separate into the Fe phase. Moreover, the corrosion resistance is highly improved by setting the crystal grain size to no more than 10 nm. This is because the crystal grain size highly contributes to the corrosion resistance of the magnetic film. The magnetic thin film prepared by subjecting the magnetic film of the alloy to the heat treatment separates into at least two phases: the small crystal phase of Fe and the small crystal phase of carbides, nitrides or borides.

The soft magnetic thin film according to this first embodiment of the present invention can be used in at least one portion of a magnetic head core to construct a magnetic head. An especially preferable magnetic head is of the metal-in-gap (MIG) type. If this magnetic head is used, it is possible to construct a magnetic recording unit for recording information in/on a moving information recording medium by using the magnetic properties. The information to be recorded may be video information and/or audio information, and the moving information recording medium may be exemplified by a magnetic tape or a magnetic disc formed with a magnetic recording layer.

According to the objects of this first embodiment of the present invention, a small crystal separation type soft magnetic film is provided. The magnetic film has small crystals that can be stably formed so that it can have excellent soft magnetic properties. Since, moreover, the small crystals obtained have a crystal grain size of no more than 10 nm in the α-Fe phase, the magnetic film can have a high corrosion resistance, and a magnetic head manufactured using the thin film and a corresponding magnetic recording unit using the magnetic head can have good reliability.

Further, according to this first embodiment of the invention, the corrosion resistance of a magnetic film can be retained without the deterioration of the soft magnetic properties by adding the two elements of Al and Rh or Ru together. This is because of the two effects of suppressing the growth of the crystal grain and improving the corrosion resistance of the Fe, which can be obtained from the fact that the small crystal separation magnetic film after the heat treatment separates into the two layers of the Fe phase and the carbide, boride or nitride phase and that these added elements separate into the Fe phase.

According to another embodiment of the invention, in particular, for those magnetic films that are applied to a VTR head, they are required to have not only the high saturation magnetization for improving the recording characteristics but also a high permeability, a low coercive force and soft magnetic properties for realizing excellent reading characteristics. The magnetic films are further required to have a small absolute value of magnetostriction constant so that the magnetic properties are not be deteriorated by internal stress occurring when the thin films are formed on head substrates by a method such as sputtering, or by a working stress or a thermal stress which is applied to the magnetic head being worked. On the other hand, the magnetic head is required to have a hardness against the magnetic tape which runs thereon.

Accordingly, another object of the present invention is to provide a magnetic film, which has a high saturation magnetization, a high permeability, a low coercive force and a low magnetostriction constant and which is excellent in corrosion resistance and in hardness, and a magnetic head that uses the magnetic film.

As part of the other embodiment of the present invention, the corrosion resistance of the aforementioned carbon and nitrogen series alloy magnetic films can be improved by adding Cr. In case too much Cr is added, however, there arises a problem that the saturation magnetization drops. In order to solve this problem, a Pt group element such as Ru or Rh is added that is highly effective in providing corrosion resistance. Thus, the addition of the alloy group element such as Ru or Rh provides corrosion resistance for the aforementioned carbon and nitrogen series alloys. However, no matter which of the Pt group element or the Cr might be added, there arises another problem that the magnetostriction constant seriously increases. In order to solve this problem, Si is added. That is, the magnetostriction constant can be reduced by adding Si to an alloy film which is composed mainly of Fe, the remainder being a transition metal element such as Ti, Zr, Hf, Ta or Nb, carbon, nitrogen and a platinum group element.

According to this embodiment of the present invention, a magnetic film having the following compositions (1) to (4) is used for providing a magnetic film, which has properties such as a high saturation magnetization, a high permeability and a low coercive force and which is excellent in the corrosion resistance and the hardness, and a magnetic head using the magnetic film.

(1) A magnetic film having a composition expressed by a composition formula of $Fe_aSi_cT_dX_eZ_g$.

Here, T: at least one element selected from the group consisting of Ti, Zr, Hf, Nb, Ta, Mo and W; X: at least one element selected from the group consisting of Ru, Rh, Os, Ir, Pd and Pt; Z: at least one element selected from the group consisting of C and N; and a, c, d, e and g designate atomic percentages of $5 \leq c \leq 20$, $2 \leq d \leq 20$, $0.5 \leq e \leq 15$, and $1 \leq g \leq 20$, and a+c+d+e+g=100.

(2) A magnetic film having a composition expressed by a composition formula of $Fe_aSi_cT_dX_eY_fZ_g$.

Here, T: at least one element selected from the group consisting of Ti, Zr, Hf, Nb, Ta, Mo and W; X: at least one element selected from the group consisting of Ru, Rh, Os, Ir, Pd and Pt; Y: at least one element selected from the group consisting of Cr and Al; Z: at least one element selected from the group consisting of C and N; and a, c, d, e, f and g designate atomic percentages of $5 \leq c \leq 20$, $2 \leq d \leq 20$, $0.5 \leq e \leq 15$, and $1 \leq g \leq 20$, and a+c+d+e+g=100.

(3) A magnetic film having a composition expressed by a composition formula of $Fe_aM_bSi_cT_dX_eZ_g$.

Here, M: at least one element selected from the group consisting of Co and Ni; T: at least one element selected from the group consisting of Ti, Zr, Hf, Nb, Ta, Mo and W; X: at least one element selected from the group consisting of Ru, Rh, Os, Ir, Pd and Pt; Z: at least one element selected from the group consisting of C and N; and a, c, d, e and g designate atomic percentages of b 15, 5 c 20, 2 d 20, 0.5 e 15, and 1 g 20, and a+b+c+d+e+g=100.

(4) A magnetic film having a composition expressed by a composition formula of $Fe_aM_bSi_cT_dX_eY_fZ_g$.

Here, M: at least one element selected from the group consisting of Co and Ni; T: at least one element selected from the group consisting of Ti, Zr, Hf, Nb, Ta, Mo and W; X: at least one element selected from the group consisting of Ru, Rh, Os, Ir, Pd and Pt; Y: at least one element selected from the group consisting of Cr and Al; Z: at least one element selected from the group consisting of C and N; and a, c, d, e, f and g designate atomic percentages of b 15, 5 c 20, 2 d 20, 0.5 e 15, f 15, and 1 g 20, and a+b+c+d+e+f+g=100.

In the aforementioned magnetic films (1) to (4), the element X is preferred to be at least one element selected from the group consisting of Ru, Rh and Os.

In any of the aforementioned magnetic films, moreover, the element X may have a concentration within a range of $3 \leq e \leq 15$, preferably a range of $3 \leq e \leq 10$. The element Si may have a concentration within a range of $10 \leq c \leq 15$. The element T may have a concentration within a range of $2 \leq d \leq 10$. The element Z may have a concentration of within a range of $3 \leq g \leq 10$. The element Y may have a concentration within a range of $f \leq 10$. The element M may have a concentration within a range of $b \leq 10$. In case the element Y is added in addition to the element X, their sum may be no more than 15 at. %. In case the element M is added in addition to the element X, their sum may be no more than 15 at. %. In case the elements Y and M are added in addition to the element X, their sum may be no more than 15 at. %.

The alloy magnetic film of the present invention is formed by the thin film forming technique such as the sputtering method or the vacuum deposition method. The magnetic film may be formed by the sputtering method such as the dipolar sputtering method, the magnetron sputtering method or the ion beam sputtering method. The magnetic film is subjected, after formed, to a heat treatment at a temperature of 400° C. or higher. The magnetic film has an average crystal grain diameter of no more than 50 nm, preferably no more than 20 nm.

The magnetic head is formed by using the aforementioned magnetic film in at least one portion of the magnetic core near the cap. This magnetic head can also be used as a thin film magnetic head for the magnetic disc. The magnetic head can be further used as a MIG type head for the magnetic disc and the VTR, in which a high saturation magnetization magnetic film is formed on the gap face of a ferrite head. The magnetic head can be further used for a composite heat for the VTR, in which the high saturation magnetization magnetic film is formed in the vicinity of the gap of the ferrite head and in which the interface between the ferrite and the magnetic film is not in parallel with the gap face. On the other hand, the magnetic head can be used as one for the VTR, in which the magnetic films are laminated on a non-magnetic substrate to form a magnetic path. Since the aforementioned magnetic film exhibits the preferable magnetic properties if it has a thickness no less than 1 μm, it is suitable for the VTR head which is required to have a thick magnetic film.

By using at least one of the aforementioned magnetic heads, the magnetic recording device is enabled to have its operational reliability drastically enhanced in the atmosphere in which it is troubled by the corrosion, e.g., in which it experiences a high humidity or in which corrosive substances such as chloride ions are present.

The transition metal T selected from the group consisting of Ti, Zr, Hf, Nb, Ta, Mo and W combines with C or N by the heat treatment to which it is subjected after the magnetic film was formed, so that it separates mainly into the crystalline granular boundary of Fe to suppress the crystal growth. As a result, the magnetic film has a structure constructed of small crystal grains of at least no more than 50 nm, normally no more than about 20 nm, so that it has excellent soft magnetic properties in the high permeability and the low coercive force and exhibits a high thermal resistance. In order to achieve this effect, the total concentration of the transition metal T has to be no less than 2 at. % (i.e., atomic %, as in the following). In case, on the other hand, the total concentration of the element T is increased, the saturation magnetization drops. In case, moreover, the element T has a high total concentration to increase its component which will not combine with C or N, the deterioration is found in the soft magnetic properties and the corrosion resistance. Hence, the total concentration of the element T has to be no more than 20 at. %, preferably no more than 10 at. %.

The element group Z consisting of C or N combines with the transition metal T, as described above, to contribute to reducing the size of the crystal grains. In order to achieve this effect, the total concentration has to be no less than 1 at. %, preferably no less than 3 at. %. In case the concentration is excessively high, on the other hand, the saturation magnetization drops, and the internal stress at the time of forming the film increases to cause the separation of the magnetic film and the substrate cracking. Therefore, the concentration has to be no more than 20 at. %, preferably no more than 10 at. %.

The element group X consisting of Ru, Rh, Os, Ir, Pt and Pd increases the corrosion resistance of the crystal grains composed mainly of Fe. Thanks to this addition, moreover, the saturation magnetization is not reduced but may be improved. In order to achieve the improvement of the corrosion resistance, the concentration of the element X has to be no less than 0.5 at. %, preferably no less than 3 at. % so as to enhance the corrosion resistance improving effect. In case, however, the X element group is increased, the magnetostriction constant seriously increases. Hence, the addition of the X element group has to be no more than 15 at. %, preferably no more than 10 at. %. Of those elements, the Ru, Rh, Ir or Os is prominently effective for the corrosion resistance improvement.

In addition to the X element group, a further addition of the Y element group such as Al or Cr is effective for improving the corrosion resistance. However, since this Y element group reduces the saturation magnetization and increases the magnetostriction constant, the addition of the Y element group has to be no more than 15 at. %, preferably no more than 10 at. %. In case, on the other hand, the Y element group is added in addition to the X element group, they increase the magnetostriction constant if their concentration sum is high. Hence, the sum of the X element group and the Y element group may preferably be no more than 15 at. %.

The element group M consisting of Co and Ni is effective for increasing the saturation magnetization and for improving the corrosion resistance. Since, however, they increase the magnetostriction constant to the higher level as they are added the more, their addition has to be no more than 15 at. %, preferably no more than 10 at. %. In case, moreover, the element group M is added in addition to the element group N, they increase the magnetostriction constant if their sum is excessive. Hence, the sum of the X element group and the M element group may be no more than 15 at. %. In case, moreover, the element group Y and the element group M are added in addition to the element group X, they also increase the magnetostriction constant if their sum is excessive. Hence, the sum of the X element group, the Y element group and the M element group has to be no more than 15 at. %.

The element Si has an effect for reducing the magnetostriction constant, which is exhibited from a relatively large amount of its addition. Hence, the addition of Si has to be no less than 5 at. %, preferably no less than 10 at. %. However, an excessive addition will reduce the saturation magnetization excessively. Hence, the addition of Si has to be no more than 20 at. %, preferably no more than 15 at. %.

If the magnetic film is subjected, after formed, to a heat treatment at a temperature of 400 or higher, the film structure, in which the individual elements are substantially homogeneously dispersed, changed to a structure, which has small crystal grains composed mainly of Fe and a size of at least no more than about 50 nm, ordinarily no more than about 20 nm and small chemical compounds of the element group T or the N and/or C around the small crystal grains. As a result, there are developed the soft magnetic properties of a high permeability and a low coercive force and the properties of a low magnetostriction constant, a high saturation magnetization and a high thermal resistance.

DETAILED DESCRIPTION OF THE PREFERRED EMBODIMENTS

Figure 1A:
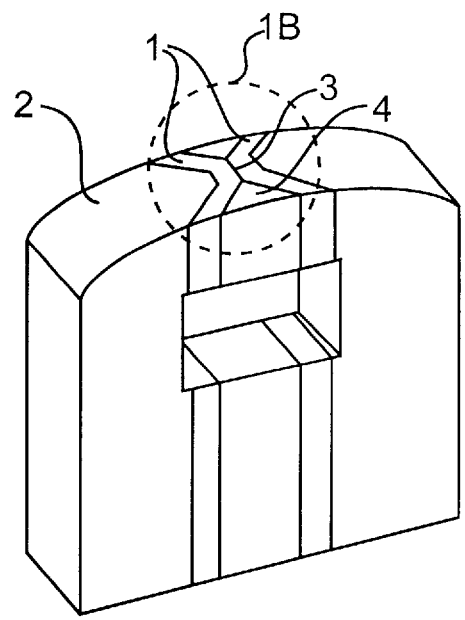
FIG. 1A is a schematic diagram showing a structure of a metal-in-gap (MIG) type magnetic head formed using the magnetic film of the present invention.

The present invention will be described in detail in connection with the following examples, beginning with examples 1–5 directed to a magnetic film formed according to the first embodiment of the invention.

EXAMPLE 1

A magnetic thin film used in forming a magnetic head was made of an alloy of Fe—Ta—C—Al—Ru. This alloy was formed as a film by the sputtering method. The target used in this sputtering method was prepared by molding the powders of the individual elements Fe, Ta, C, Fe$_3$Al and Ru together by hot isostatic pressing (i.e., the HIP method). The target had three kinds of composition of $(Fe_{75}Ta_{10}C_{15})_{1-X}(Al_{60}Ru_{40})X$, wherein X=0.05, 0.07 and 0.125. Here, comparisons were also prepared by setting X=0.15 and by adding 0.4 at. % of Al and Ru. When targets prepared by that HIP method were used, the films had their compositions substantially unchanged from those of the targets even after they had been thinned, and the oxygen concentration in the films could be reduced. A ferrite substrate was sputtered by using those alloy targets and an Ar gas as the discharge gas. The magnetic films thus formed had a thickness of 5 μm. The sputtering conditions included a discharge gas pressure of 5 mTorr and an RF power of 400 W. These values can be changed according to the sputtering apparatus that is used and in consideration of the controlling the internal stress of the film, and accordingly should not be interpreted as restricting the formation of the magnetic film of the present invention.

The magnetic films thus formed have the magnetic properties, as enumerated in Table 1. In the case of four kinds of X=0.05, 0.07, 0.125 and 0.15 and in the case of Al and Ru being individually added by 0.4 at. %, it is found that the magnetic film has the soft magnetic properties suitable for the magnetic head, such as Hc≧10e, Bs≧1.4 T, $\mu$≧1,000 and $\lambda$≧3×10$^{-6}$. For comparison, moreover, there are also enumerated in Table 1 the relations between the added concentrations and the magnetic properties of the series in which the Al, Rh and Ru were individually added exclusively.

TABLE 1

| Material Family | X | Bs(T) | Hc(Oe) | $\mu$ | $\lambda$ | Corrosion Resistance |
|---|---|---|---|---|---|---|
| (Fe$_{75}$Ta$_{10}$C$_{15}$)$_{1-x}$ | 0.05 | 1.50 | 0.20 | 3000 | 7 × 10$^{-7}$ | O |
| (Al$_{60}$Ru$_{40}$)$_x$ | 0.07 | 1.45 | 0.40 | 2600 | 1 × 10$^{-6}$ | O |
| | 0.125 | 1.40 | 0.60 | 2200 | 3 × 10$^{-6}$ | O |
| | 0.15 | 1.32 | 1.20 | 900 | 5 × 10$^{-6}$ | O |
| (Fe$_{75}$Ta$_{10}$C$_{15}$)$_{1-x}$ | 0.008 | 1.57 | 0.20 | 3500 | 6 × 10$^{-7}$ | X |
| (Al$_{50}$Ru$_{50}$)$_x$ | 0.01 | 1.55 | 0.20 | 3300 | 6 × 10$^{-7}$ | O |
| (Fe$_{75}$Ta$_{10}$C$_{15}$)$_{1-x}$ | 0.03 | 1.53 | 0.20 | 3000 | 1 × 10$^{-6}$ | X |
| Al$_{100x}$ | 0.05 | 1.50 | 0.30 | 2700 | 4 × 10$^{-6}$ | X |
| | 0.08 | 1.48 | 0.55 | 2500 | 7 × 10$^{-6}$ | O |
| (Fe$_{75}$Ta$_{10}$C$_{15}$)$_{1-x}$ | 0.02 | 1.50 | 0.30 | 2500 | 9 × 10$^{-7}$ | X |
| Ru$_{100x}$ | 0.05 | 1.40 | 1.10 | 900 | 2 × 10$^{-6}$ | O |
| | 0.08 | 1.30 | 2.30 | 600 | 4 × 10$^{-6}$ | O |
| (Fe$_{75}$Ta$_{10}$C$_{15}$)$_{1-x}$ | 0.02 | 1.45 | 0.35 | 2000 | 1 × 10$^{-6}$ | X |
| Rh$_{100x}$ | 0.05 | 1.38 | 0.89 | 700 | 4 × 10$^{-6}$ | O |
| | 0.08 | 1.35 | 2.00 | 500 | 6 × 10$^{-6}$ | O |

From Table 1, it is found that in case the Rh, Ru or Al was solely added, the magnetostriction constant abruptly increased with the increase of the concentration of addition, and that the increasing rates were far larger than those of the case in which the (Al, Ru) were added together. Moreover, the coercive force abruptly increased with the increase of the concentration of addition of the Ru. It is also found that the increasing rate was larger than that of the case of the double addition of the (Al, Rh). Especially in the case of Rh being solely added, the magnetostriction constant drastically changes, but the changing rate was unchanged without depending upon the elements by the double addition. Thus, in the case of the double addition of (Al, Ru) or (Al, Rh), the magnetic properties were less deteriorated by the addition of the elements than those of the magnetic film to which was added only one element of Al, Rh or Ru, individually.

Next, the magnetic film of the present invention had its structure observed by a transmission type electron microscope to determine the grain size. The result was about 9 nm to 12 nm in the $\alpha$-Fe phase. Moreover, the TaC phase was bout 3 nm to 5 nm. On the other hand, the grating space was determined by the diffraction of the electron beam to find that the $\alpha$-Fe phase was 0.20 nm in the FeTaC magnetic film and increased with the increase of the concentration of the element added until it reached 0.25 nm in the case of X−0.125. From this observation, it is thought that the added (Al, Ru) separated into the Fe phase.

The aforementioned individual magnetic films were formed (to have a thickness of 5 $\mu$m) over a crystallized glass substrate having a size of 15 mm×15 mm and a thickness of 0.4 mm and were investigated whether or not they were corroded, by covering the magnetic films with paraffin at their end portions, by dipping them in an aqueous solution of sodium chloride of 0.5N for 500 hours, and by visually inspecting their surfaces. The results of these investigations are enumerated as the "CR (corrosion resistance)" at the right-hand column of Table 1. The evaluations of these corrosion resistance values are indicated by "O" for the specimens having no corrosion and by "x" for the specimens having any corrosion. As seen from Table 1, no corrosion was found by the visual observations for X=0.05, 0.08 and 0.125. Moreover, the specimens were dipped for 500 hours and then their magnetic properties were measured, but their characteristics were not different in the least from those of the specimens just after they were prepared. Moreover, the magnetic films were left in atmosphere of 95% RH at 80° C. for 2,000 hours or longer, but no corrosion was found and the magnetic properties were found to be unchanged. On the contrary, neither the magnetic films having 0.4 at. % of Al and Ru added thereto nor the magnetic films having the Al or Ru solely added thereto could be found to be without any corrosion within a range capable of providing the magnetic properties suitable for the magnetic head.

Figure 1B:
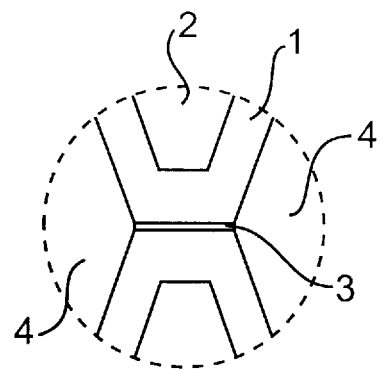
FIG. 1B is an enlarged partial view of the portion 1B of FIG. 1A.

A soft magnetic thin film 1 of the present embodiment was formed on a ferrite substrate 2 of a single crystal to prepare a MIG (i.e., metal-in-gap) type head, as schematically shown in FIG. 1A and 1B. The magnetic film used had the composition of (Fe$_{75}$Ta$_{10}$C$_{15}$)$_{1-x}$(Al$_{60}$Ru$_{40}$)$_x$ wherein X=0.05. A gap portion 3 was formed by forming a film of SiO$_2$ having a thickness of 200 nm over the soft magnetic thin film 1 formed on the ferrite substrate 2 and by forming a film of Cr having a thickness of 100 nm. This structure was thermally treated in a nitrogen gas flow at 600° C. for 1 hour, and a head substrate having an identical shape was bonded thereto by low-melting point glass 4. In order to improve the bondability, there may be interposed between the substrate and the magnetic film a bonding layer which is made of Al, Cr, SiO$_2$, SiN$_x$, Cr$_2$O$_3$ or the like.

This magnetic head was used to make a VTR device, and video information was recorded by driving the magnetic tape. An S/N ratio was 40 dB or higher when the digital information for the high vision was recorded under the conditions of a relative speed of 36 m/s, a data rate of 46.1 Mbps and a track width of 40 Mm.

This head had its corrosion resistance evaluated by the dipping test method, in which it was dipped in an aqueous solution of sodium chloride of 0.5N, and by the moisture condensation method in a high-temperature and high-humidity atmosphere. First of all, the MIG type head chip having the shape, as shown in FIG. 1A, was dipped in the aqueous solution of 0.5N for 500 hours. After this, the head was set again in the device, and the recording/reading characteristics were measured. The results reveal that no difference was found in the recording/reading characteristics from those of the head before being dipped. Moreover, the evaluations of the moisture condensation method in the hot and humid atmosphere were carried out by fixing the aforementioned MIG type head on a Peltier element at 10° C. and by leaving it in an atmosphere having a temperature of 60° C. and a relative humidity of 95%. As a result, the condensation took place on the entire head. The head was left in that atmosphere in that state for 2,000 hours or more, but neither corrosion nor deterioration of the recorded or read signals could be found.

Although the present invention has been described as a magnetic film used in a magnetic head application for a VTR, for example, it can also be used with a magnetic disc or a magnetic tape device which uses the helical scanning.

Moreover, the description thus far made is directed to the case in which the film of a Fe—Ta—C—Al—Ru alloy was used as the magnetic film, but similar results could be obtained by using the Rh as the added element in place of the Ru. In addition, similar evaluations were made on the magnetic films, in which the element Ta was replaced by the Zr, Hf, Ti and Nb, to find out that the magnetic properties and the corrosion resistance obtained were similar to those of the case of the Fe—Ta—C—Al—Ru alloy film, as enumerated in the following Table 2, which is followed by Table 3 for comparison purposes.

TABLE 2

| Sample | Bs(t) | Hc(Oe) | $\mu$ | $\lambda$ | CR |
|---|---|---|---|---|---|
| 1($Fe_{76}Ta_9C_{15})_{0.90}(Al_{80}Rh_{20})_{0.10}$ | 1.52 | 0.20 | 3000 | $6 \times 10^{-7}$ | 0 |
| 2($Fe_{76}Ta_9C_{15})_{0.85}(Al_{80}Rh_{20})_{0.15}$ | 1.42 | 0.30 | 2600 | $1 \times 10^{-6}$ | 0 |
| 3($Fe_{76}Ta_9C_{15})_{0.95}(Al_{80}Rh_{20})_{0.05}$ | 1.55 | 0.14 | 3500 | $7 \times 10^{-7}$ | 0 |
| 4($Fe_{76}Zr_9C_{15})_{0.95}(Al_{80}Ru_{20})_{0.05}$ | 1.52 | 0.18 | 3000 | $5 \times 10^{-7}$ | 0 |
| 5($Fe_{76}Zr_9C_{15})_{0.90}(Al_{80}Ru_{20})_{0.10}$ | 1.47 | 0.22 | 2400 | $6 \times 10^{-7}$ | 0 |
| 6($Fe_{76}Zr_9C_{15})_{0.85}(Al_{80}Ru_{20})_{0.15}$ | 1.42 | 0.32 | 2000 | $8 \times 10^{-7}$ | 0 |
| 7($Fe_{78}Hf_7C_{15})_{0.95}(Al_{80}Ru_{20})_{0.05}$ | 1.55 | 0.20 | 3500 | $6 \times 10^{-7}$ | 0 |
| 8($Fe_{78}Hf_7C_{15})_{0.90}(Al_{80}Ru_{20})_{0.10}$ | 1.50 | 0.28 | 3000 | $7 \times 10^{-7}$ | 0 |
| 9($Fe_{78}Hf_7C_{15})_{0.85}(Al_{80}Ru_{20})_{0.15}$ | 1.45 | 0.30 | 2300 | $9 \times 10^{-7}$ | 0 |
| 10($Fe_{78}Ti_7C_{15})_{0.95}(Al_{80}Ru_{20})_{0.05}$ | 1.53 | 0.20 | 3000 | $6 \times 10^{-7}$ | 0 |
| 11($Fe_{78}Hf_7C_{15})_{0.90}(Al_{80}Ru_{20})_{0.10}$ | 1.46 | 0.25 | 2300 | $9 \times 10^{-7}$ | 0 |
| 12($Fe_{78}Hf_7C_{15})_{0.85}(Al_{80}Ru_{20})_{0.15}$ | 1.41 | 0.28 | 1900 | $9 \times 10^{-7}$ | 0 |
| 13($Fe_{76}Nb_9C_{15})_{0.90}(Al_{80}Ru_{20})_{0.15}$ | 1.45 | 0.30 | 1800 | $7 \times 10^{-7}$ | 0 |
| 14($Fe_{76}Nb_9C_{15})_{0.90}(Al_{70}Ru_{30})_{0.10}$ | 1.45 | 0.30 | 1800 | $7 \times 10^{-7}$ | 0 |
| 15($Fe_{78}Nb_9C_{13})_{0.90}(Al_{70}Ru_{30})_{0.15}$ | 1.45 | 0.30 | 1800 | $7 \times 10^{-7}$ | 0 |
| 16($Fe_{76}Nb_9C_{15})_{0.90}(Al_{75}Rh_{25})_{0.10}$ | 1.40 | 0.40 | 1500 | $8 \times 10^{-7}$ | 0 |
| 17($Fe_{78}Nb_9C_{13})_{0.90}(Al_{75}Rh_{25})_{0.10}$ | 1.40 | 0.40 | 1500 | $8 \times 10^{-7}$ | 0 |
| 18($Fe_{76}Nb_9C_{15})_{0.92}(Al_{80}Ru_{20})_{0.08}$ | 1.40 | 0.40 | 2000 | $8 \times 10^{-7}$ | 0 |
| 19($Fe_{76}Ta_5Zr_4C_{15})_{0.90}(Al_{75}Rh_{25})_{0.10}$ | 1.40 | 0.40 | 1800 | $9 \times 10^{-7}$ | 0 |
| 20($Fe_{76}Ta_5Hf_4C_{15})_{0.95}(Al_{75}Rh_{25})_{0.05}$ | 1.45 | 0.40 | 2300 | $6 \times 10^{-7}$ | 0 |
| 21($Fe_{76}Ta_5Ti_4C_{15})_{0.80}(Al_{75}Rh_{25})_{0.15}$ | 1.40 | 0.40 | 1400 | $1 \times 10^{-6}$ | 0 |
| 22($Fe_{76}Ta_5Nb_4C_{15})_{0.93}(Al_{75}Rh_{25})_{0.07}$ | 1.49 | 0.40 | 1800 | $7 \times 10^{-7}$ | 0 |

TABLE 3

| Sample | Bs(t) | Hc(Oe) | $\mu$ | $\lambda$ | CR |
|---|---|---|---|---|---|
| 1($Fe_{76}Ta_{10}C_{14})_{0.80}(Al_{75}Ru_{25})_{0.20}$ | 1.20 | 3.50 | 800 | $4 \times 10^{-6}$ | 0 |
| 2($Fe_{76}Zr_{10}C_{14})_{0.80}(Al_{75}Ru_{25})_{0.20}$ | 1.20 | 3.50 | 800 | $1 \times 10^{-6}$ | 0 |
| 3($Fe_{76}Hf_{10}C_{14})_{0.80}(Al_{75}Ru_{25})_{0.20}$ | 1.25 | 3.50 | 800 | $1 \times 10^{-6}$ | 0 |
| 4($Fe_{76}Ti_{10}C_{14})_{0.80}(Al_{75}Ru_{25})_{0.20}$ | 1.20 | 3.50 | 800 | $1 \times 10^{-6}$ | 0 |
| 5($Fe_{76}Nb_{10}C_{14})_{0.80}(Al_{75}Ru_{25})_{0.20}$ | 1.20 | 3.50 | 800 | $1 \times 10^{-6}$ | 0 |
| 6($Fe_{76}Nb_{10}C_{14})_{0.80}(Al_{75}Ru_{25})_{0.20}$ | 1.20 | 3.50 | 800 | $5 \times 10^{-6}$ | 0 |

As shown in Table 3, if on the other hand, the composition was out of the range of the present invention, the magnetic film obtained was excellent in the corrosion resistance but had magnetic properties unsuitable for the magnetic head material.

EXAMPLE 2

A magnetic thin film of a second example of the invention was made of an alloy of Fe—Ta—N—Al—Ru. This alloy was filmed by the sputtering method. The target used in this sputtering method was prepared by molding the powders of the individual elements Fe, Ta, $Fe_3Al$ and Ru together by hot isostatic pressing (i.e., the HIP method). The target had three kinds of compositions of $(Fe_{85}Ta_{15})_{1-x}(Al_{60}Ru_{40})_x$, wherein X=0.05, 0.07 and 0.125. Comparisons were also prepared by setting X=0.15 and by adding 0.4 at. % of Al and Ru. When the targets prepared by the HIP method were used, the films had their compositions substantially unchanged from those of the targets even after they had been thinned. A ferrite substrate was sputtered by using the alloy targets and an $Ar-N_2$ mixture gas (having a mixture ratio: Ar/N2=94/6) as the discharge gas. The magnetic films thus formed had a thickness of 5 $\mu$m. The sputtering conditions included a discharge gas pressure of 5 mTorr and an RF power of 400 W.

The magnetic film thus formed had the magnetic properties, as enumerated in Table 4. Here, the formed magnetic film had a composition of $(Fe_{72}Ta_{15}N_{13})_{1-x}(Al_{60}Ru_{40})_x$. In the case of (three cases) of X=0.05, 0.07 and 0.125 wherein the Al and Ru were individually added to achieve a sum of by 0.4 at. %, it is found that the magnetic film had the soft magnetic properties suitable for the magnetic head, such as $Hc \leq 1Oe$, $Bs \geq 1.4T$, $\mu \geq 1,000$ and $\lambda \leq 3 \times 10^{-6}$. For comparison, moreover, there are also enumerated in Table 4 the relations between the added concentrations and the magnetic properties of the series in which the Al, Rh and Ru were individually added exclusively, in the case of X=0.15.

TABLE 4

| Material Family | X | Magnetic Properties | | | | Corrosion Resistance |
|---|---|---|---|---|---|---|
| | | Bs(T) | Hc(Oe) | $\mu$ | $\lambda$ | |
| $(Fe_{72}Ta_{15}N_{13})_{1-x}$ $(Al_{60}Ru_{40})_x$ | 0.05 | 1.50 | 0.20 | 3000 | $7 \times 10^{-7}$ | 0 |
| | 0.07 | 1.45 | 0.40 | 2600 | $1 \times 10^{-6}$ | 0 |
| | 0.125 | 1.40 | 0.50 | 2000 | $3 \times 10^{-6}$ | 0 |
| | 0.15 | 1.30 | 1.20 | 800 | $5 \times 10^{-6}$ | 0 |
| $(Fe_{72}Ta_{15}N_{13})_{1-x}$ $Al_{100x}$ | 0.008 | 1.55 | 0.20 | 3200 | $7 \times 10^{-7}$ | X |
| | 0.01 | 1.50 | 0.40 | 3000 | $8 \times 10^{-7}$ | 0 |
| $(Fe_{72}Ta_{15}N_{13})_{1-x}$ $Al_{100x}$ | 0.04 | 1.50 | 0.30 | 2800 | $1 \times 10^{-6}$ | X |
| | 0.06 | 1.40 | 0.60 | 1800 | $4 \times 10^{-6}$ | X |
| | 0.08 | 1.30 | 1.20 | 800 | $8 \times 10^{-6}$ | 0 |
| $(Fe_{72}Ta_{15}N_{13})_{1-x}$ $Ru_{100x}$ | 0.04 | 1.45 | 0.30 | 2000 | $1 \times 10^{-6}$ | X |
| | 0.06 | 1.39 | 2.00 | 900 | $3 \times 10^{-6}$ | 0 |
| | 0.08 | 1.30 | 6.50 | 300 | $5 \times 10^{-6}$ | 0 |

From Table 4, it is found that in case the Ru or Al was solely added the magnetostriction constant abruptly increased with the increase of the concentration of addition, and that the increasing rates were far larger than those of the case in which the (Al, Ru) were added together. Moreover, the coercive force abruptly increased with the increase of the concentration of the addition of Ru. It is also found that the increasing rate was larger than that of the case of the double addition of Al, Ru. This effect was also found in the case of the double addition of Al, Rh. In the case of Rh being solely added in this series, the increasing rate of the magentostriction constant was higher than that of the case in which the Ru was added, but the changing rate can be substantially equalized to that of the case of the double addition (of Al, Ru).

Next these magnetic films had their structures observed by a transmission type electron microscope to determine the grain size. As a result, in the α-Fe phase, the granular shape had a longer side size of about 8 nm to 12 nm and an average value of 9.5 nm. The TaN phase was no more than 3 nm and 2.2 nm on an average. On the other hand, the grating space was determined by the diffraction of the electron beam to find that the α-Fe phase was 0.20 nm in the FeTaC magnetic film and increased with the increase of the concentration of the element added and took 0.25 nm in the case of X=0.125. This indicates that the added (Al, Ru) separated into the Fe phase. These results were not substantially different from those of the case of the Fe—Ta—C series of Example 1.

The aforementioned magnetic films were dipped in an aqueous solution of sodium chloride of 0.5N for 500 hours, and their corrosion resistance values were evaluated as in Example 1. As seen from Table 4, no corrosion was found by visual observation for X=0.05, 0.07 and 0.125. Moreover, the specimens were dipped for 500 hours and then measured to determine their magnetic properties, but their properties were not different in the least from those exhibited just after being prepared. Moreover, the magnetic films of this Example were left in an atmosphere of 95% RH (relative humidity) at 80° C. for 2,000 hours or longer, but no corrosion was found and the magnetic properties were unchanged as compared to when they were just formed. On the contrary, neither the magnetic films having 0.4 at. % of Al and Ru added thereto nor the magnetic films having the Al or Ru solely added thereto could be found to be without any corrosion within a range capable of providing the magnetic properties suitable for the magnetic head.

By using the soft magnetic thin film of this Example, the MIG type head, as schematically shown in FIG. 1A, was fabricated as in Example 1. The magnetic film had a composition of $(Fe_{72}Ta_{15}N_{13})_{1-x}(Al_{60}Ru_{40})_x$, wherein X=0.05. This magnetic head was used to make a VTR device, and video information was recorded by driving the magnetic tape. An S/N ratio was 40 dB or higher when the digital information for the high vision was recorded under the conditions of a relative speed of 36 m/s, a data rate of 46.1 Mbps and a track width of 40 μm.

This head had its corrosion resistance evaluated by the dipping test method, in which it was dipped in an aqueous solution of sodium chloride of 0.5N, and by the moisture condensation method in a high-temperature and high-humidity atmosphere. First of all, the MIG type head chip having the shape first shown in FIG. 1 was dipped in the aqueous solution of sodium chloride of 0.5N for 500 hours. After this, the head was set again in the device, and the recording/reading characteristics were measured. The results reveal that no difference was found in the recording/reading characteristics from those of the head before being dipped. Moreover, the evaluations of the moisture condensation method in the hot and humid atmosphere were carried out by fixing the MIG type head on a Peltier element at 10° C. and by leaving the entirety in the atmosphere having a temperature of 60° C. and a relative humidity of 95%. As a result, the condensation took place in the entire head. The head was left in that atmosphere in that state for 2,000 hours or more, but neither corrosion nor deterioration of the recorded or read signals could be found.

The description thus far made is directed to the case in which the examples of the film are an Fe—Ta—N—Al—Ru alloy but similar results can be obtained by using Rh in place of the Ru. In addition, similar evaluations were made on magnetic films, in which the element Ta was replaced by Zr, Hf, Ti and Nb, to find out that the magnetic properties and the corrosion resistance obtained were similar to those of the case of the Fe—Ta—N—Al—Ru alloy film, as enumerated in the following Table 5, which is followed by Table 6.

TABLE 5

| Sample | Bs(t) | Hc(Oe) | μ | λ | CR |
|---|---|---|---|---|---|
| 1$(Fe_{78}Ta_9N_{13})_{0.90}(Al_{80}Rh_{20})_{0.10}$ | 1.45 | 0.30 | 2500 | $8 \times 10^{-7}$ | 0 |
| 2$(Fe_{78}Ta_9N_{13})_{0.95}(Al_{80}Rh_{20})_{0.05}$ | 1.50 | 0.30 | 3000 | $6 \times 10^{-7}$ | 0 |
| 3$(Fe_{78}Ta_9N_{13})_{0.85}(Al_{80}Rh_{20})_{0.15}$ | 1.40 | 0.30 | 1500 | $1 \times 10^{-6}$ | 0 |
| 4$(Fe_{78}Zr_9N_{13})_{0.95}(Al_{80}Ru_{20})_{0.05}$ | 1.55 | 0.25 | 2800 | $5 \times 10^{-7}$ | 0 |
| 5$(Fe_{78}Zr_9N_{13})_{0.90}(Al_{80}Ru_{20})_{0.10}$ | 1.50 | 0.25 | 2500 | $6 \times 10^{-7}$ | 0 |
| 6$(Fe_{78}Zr_9N_{13})_{0.85}(Al_{80}Ru_{20})_{0.15}$ | 1.45 | 0.25 | 2000 | $8 \times 10^{-7}$ | 0 |
| 7$(Fe_{78}Hf_9N_{13})_{0.95}(Al_{80}Ru_{20})_{0.05}$ | 1.55 | 0.25 | 3000 | $5 \times 10^{-7}$ | 0 |
| 8$(Fe_{78}Hf_9N_{13})_{0.90}(Al_{80}Ru_{20})_{0.10}$ | 1.50 | 0.25 | 2500 | $6 \times 10^{-7}$ | 0 |
| 9$(Fe_{78}Hf_9N_{13})_{0.85}(Al_{80}Ru_{20})_{0.15}$ | 1.45 | 0.25 | 2200 | $8 \times 10^{-7}$ | 0 |
| 10$(Fe_{78}Ti_9N_{13})_{0.95}(Al_{80}Ru_{20})_{0.05}$ | 1.50 | 0.28 | 2600 | $6 \times 10^{-7}$ | 0 |
| 11$(Fe_{78}Ti_9N_{13})_{0.90}(Al_{80}Ru_{20})_{0.10}$ | 1.45 | 0.28 | 2200 | $8 \times 10^{-7}$ | 0 |
| 12$(Fe_{78}Ti_9N_{13})_{0.85}(Al_{80}Ru_{20})_{0.15}$ | 1.40 | 0.28 | 2000 | $1 \times 10^{-6}$ | 0 |
| 13$(Fe_{78}Nb_9N_{13})_{0.95}(Al_{80}Ru_{20})_{0.05}$ | 1.55 | 0.25 | 3000 | $5 \times 10^{-7}$ | 0 |
| 14$(Fe_{78}Nb_9N_{13})_{0.90}(Al_{80}Ru_{20})_{0.10}$ | 1.50 | 0.25 | 2700 | $6 \times 10^{-7}$ | 0 |
| 15$(Fe_{78}Nb_9N_{13})_{0.85}(Al_{80}Ru_{20})_{0.15}$ | 1.40 | 0.25 | 2400 | $8 \times 10^{-7}$ | 0 |
| 16$(Fe_{78}Ta_5Zr_4N_{13})_{0.95}(Al_{80}Rh_{20})_{0.05}$ | 1.45 | 0.30 | 2300 | $5 \times 10^{-7}$ | 0 |
| 17$(Fe_{78}Ta_5Hf_4N_{13})_{0.90}(Al_{80}Rh_{20})_{0.10}$ | 1.40 | 0.30 | 2300 | $8 \times 10^{-7}$ | o |
| 18$(Fe_{78}Ta_5Ti_4N_{13})_{0.90}(Al_{80}Rh_{20})_{0.10}$ | 1.40 | 0.30 | 230Q | $8 \times 10^{-7}$ | 0 |
| 19$(Fe_{78}Ta_5Nb_4N_{13})_{0.90}(Al_{80}Rh_{20})_{0.10}$ | 1.40 | 0.30 | 2300 | $8 \times 10^{-7}$ | 0 |

TABLE 6

| Sample | Bs(t) | Hc(Oe) | μ | λ | CR |
|---|---|---|---|---|---|
| 1$(Fe_{78}Ta_9N_{13})_{0.80}(Al_{80}Rh_{20})_{0.20}$ | 1.20 | 1.30 | 800 | $3 \times 10^{-6}$ | 0 |
| 2$(Fe_{78}Zr_9N_{13})_{0.80}(Al_{80}Ru_{20})_{0.20}$ | 1.18 | 3.50 | 500 | $3 \times 10^{-6}$ | 0 |
| 3$(Fe_{78}Hf_9N_{13})_{0.80}(Al_{80}Rh_{20})_{0.20}$ | 1.2O | 1.30 | 700 | $5 \times 10^{-6}$ | 0 |
| 4$(Fe_{78}Ti_9N_{13})_{0.97}(Al_{80}Ru_{20})_{0.03}$ | 1.50 | 0.35 | 1900 | $8 \times 10^{-7}$ | X |
| 5$(Fe_{78}Nb_9N_{13})_{0.90}(Al_{80}Ru_{20})_{0.10}$ | 1.50 | 0.35 | 1900 | $8 \times 10^{-7}$ | X |
| 6$(Fe_{78}Ta_5Zr_9N_{13})_{0.97}(Al_{80}Rh_{20})_{0.03}$ | 1.50 | 0.35 | 1900 | $8 \times 10^{-7}$ | X |

If, on the other hand, the composition was out of the range of the present invention, the magnetic film obtained neither was excellent in the corrosion resistance nor had magnetic properties suitable for the magnetic head material, as enumerated in Table 6.

EXAMPLE 3

A magnetic thin film was formed by using B as the element to be selected from the group consisting of C, B, Si and N. This magnetic film was filmed by the sputtering method. The target used in this sputtering method was prepared by molding the powders of the elements comprising the magnetic film to be formed together by hot isostatic pressing (i.e., the HIP method). The target had three kinds of compositions of $(Fe_{72}Ta_{10}C_{15})_{1-x}(Al_{60}Ru_{40})_x$, wherein X=0.05, 0.07 and 0.125. Here, comparisons were also prepared by setting X=0.15 and by adding 0.4 at. % of Al and Ru. When the targets prepared by that HIP method were used, the films had their compositions substantially unchanged from those of the targets even after they had been thinned. A ferrite substrate was sputtered by using those alloy targets and an Ar gas as the discharge gas. The magnetic films thus formed had a thickness of 5 μm. The sputtering conditions were the discharge gas pressure of 5 mTorr and the RF power of 400 W.

The magnetic properties and the corrosion resistance of the magnetic film thus fabricated were evaluated as in Example 1. The results are enumerated in Table 7.

TABLE 7

| Sample | Bs(t) | Hc(Oe) | μ | λ | CR |
|---|---|---|---|---|---|
| 1$(Fe_{78}Ta_{12}B_{10})_{0.90}(Al_{80}Ru_{20})_{0.10}$ | 1.45 | 0.32 | 1800 | $8 \times 10^{-7}$ | 0 |
| 2$(Fe_{78}Ta_{12}B_{10})_{0.95}(Al_{80}Ru_{20})_{0.05}$ | 1.50 | 0.32 | 2400 | $6 \times 10^{-7}$ | 0 |
| 3$(Fe_{78}Ta_{12}B_{10})_{0.85}(Al_{80}Ru_{20})_{0.15}$ | 1.40 | 0.32 | 1300 | $9 \times 10^{-7}$ | 0 |
| 4$(Fe_{78}Ti_{12}B_{10})_{0.95}(Al_{80}Ru_{20})_{0.05}$ | 1.50 | 0.40 | 2000 | $9 \times 10^{-7}$ | 0 |
| 5$(Fe_{78}Ti_{12}B_{10})_{0.90}(Al_{80}Ru_{20})_{0.10}$ | 1.45 | 0.40 | 1600 | $9 \times 10^{-7}$ | 0 |
| 6$(Fe_{78}Ti_{12}B_{10})_{0.85}(Al_{80}Ru_{20})_{0.15}$ | 1.40 | 0.40 | 1300 | $1 \times 10^{-6}$ | 0 |
| 7$(Fe_{78}Zr_{12}B_{10})_{0.95}(Al_{80}Ru_{20})_{0.05}$ | 1.50 | 0.38 | 2000 | $9 \times 10^{-7}$ | 0 |
| 8$(Fe_{78}Zr_{12}B_{10})_{0.90}(Al_{80}Ru_{20})_{0.10}$ | 1.45 | 0.38 | 1600 | $9 \times 10^{-7}$ | 0 |
| 9$(Fe_{78}Zr_{12}B_{10})_{0.85}(Al_{80}Ru_{20})_{0.15}$ | 1.40 | 0.38 | 1300 | $1 \times 10^{-6}$ | 0 |
| 10$(Fe_{78}Hf_{12}B_{10})_{0.95}(Al_{80}Ru_{20})_{0.05}$ | 1.50 | 0.30 | 2400 | $7 \times 10^{-7}$ | 0 |
| 11$(Fe_{78}Hf_{12}B_{10})_{0.90}(Al_{80}Ru_{20})_{0.10}$ | 1.45 | 0.30 | 2100 | $8 \times 10^{-7}$ | 0 |
| 12$(Fe_{78}Hf_{12}B_{10})_{0.85}(Al_{80}Ru_{20})_{0.15}$ | 1.40 | 0.30 | 1900 | $8 \times 10^{-7}$ | 0 |
| 13$(Fe_{78}Nb_{12}B_{10})_{0.95}(Al_{75}Ru_{25})_{0.05}$ | 1.50 | 0.30 | 2200 | $6 \times 10^{-7}$ | 0 |
| 14$(Fe_{78}Nb_{12}B_{10})_{0.90}(Al_{75}Ru_{25})_{0.10}$ | 1.45 | 0.30 | 2000 | $8 \times 10^{-7}$ | 0 |
| 15$(Fe_{78}Nb_{12}B_{10})_{0.85}(Al_{75}Ru_{25})_{0.15}$ | 1.40 | 0.30 | 1700 | $1 \times 10^{-6}$ | 0 |
| 16$(Fe_{78}Ta_{12}B_{10})_{0.90}(Al_{75}Ru_{25})_{0.10}$ | 1.40 | 0.30 | 2000 | $7 \times 10^{-7}$ | 0 |
| 17$(Fe_{78}Ti_{12}B_{10})_{0.90}(Al_{75}Ru_{25})_{0.10}$ | 1.40 | 0.30 | 1800 | $7 \times 10^{-7}$ | 0 |
| 18$(Fe_{78}Zr_{12}B_{10})_{0.90}(Al_{75}Ru_{25})_{0.10}$ | 1.40 | 0.30 | 1800 | $9 \times 10^{-7}$ | 0 |
| 19$(Fe_{78}Hf_{12}B_{10})_{0.90}(Al_{75}Ru_{25})_{0.10}$ | 1.45 | 0.30 | 2200 | $7 \times 10^{-7}$ | 0 |
| 20$(Fe_{78}Nb_{12}B_{10})_{0.90}(Al_{75}Ru_{25})_{0.10}$ | 1.45 | 0.30 | 1800 | $9 \times 10^{-7}$ | 0 |
| 21$(Fe_{78}Ta_6Ti_6B_{10})_{0.90}(Al_{75}Ru_{25})_{0.10}$ | 1.40 | 0.32 | 1800 | $8 \times 10^{-7}$ | 0 |
| 22$(Fe_{78}Ti_6Zr_6B_{10})_{0.90}(Al_{75}Ru_{25})_{0.10}$ | 1.40 | 0.32 | 1700 | $7 \times 10^{-7}$ | 0 |
| 23$(Fe_{78}Zr_6Hf_6B_{10})_{0.90}(Al_{75}Ru_{25})_{0.10}$ | 1.40 | 0.32 | 1700 | $9 \times 10^{-7}$ | 0 |
| 24$(Fe_{78}Hf_6Nb_6B_{10})_{0.90}(Al_{75}Ru_{25})_{0.10}$ | 1.43 | 0.33 | 2000 | $7 \times 10^{-7}$ | 0 |

If, on the other hand, the composition was out of the range of the present invention, the magnetic film obtained was excellent in the corrosion resistance but had magnetic properties unsuitable for the magnetic head material, as enumerated in the following Table 8.

TABLE 8

| Sample | Bs(t) | Hc(Oe) | μ | λ | CR |
|---|---|---|---|---|---|
| 1$(Fe_{78}Ta_{12}B_{10})_{0.80}(Al_{80}Ru_{20})_{0.10}$ | 1.20 | 10.88 | 900 | $8 \times 10^{-7}$ | 0 |
| 2$(Fe_{78}Ti_{12}B_{10})_{0.80}(Al_{75}Ru_{25})_{0.20}$ | 1.20 | 10.88 | 800 | $8 \times 10^{-7}$ | 0 |
| 3$(Fe_{78}Zr_{12}B_{10})_{0.80}(Al_{75}Ru_{25})_{0.20}$ | 1.20 | 10.88 | 800 | $9 \times 10^{-7}$ | 0 |
| 4$(Fe_{78}Hf_{12}B_{10})_{0.80}(Al_{75}Ru_{25})_{0.20}$ | 1.30 | 10.28 | 900 | $7 \times 10^{-7}$ | 0 |
| 5$(Fe_{78}Nb_{12}B_{10})_{0.80}(Al_{75}Ru_{25})_{0.20}$ | 1.20 | 10.30 | 900 | $9 \times 10^{-7}$ | 0 |

As apparent from Tables 7 and 8, it is found that the concentrations of the elements to be added have the optimum ranges for the magnetic properties and the corrosion resistance.

EXAMPLE 4

A magnetic thin film was formed by using the Si as the element to be selected from the group consisting of C, B, Si and N. This magnetic film was formed by the sputtering method. The target used in this sputtering method was prepared by molding the powders of the elements composing the magnetic film to be formed together by hot isostatic pressing (i.e., the HIP method). The target had three kinds of compositions of $(Fe_{75}Ta_{10}C_{15})_{1-x}(Al_{60}Ru_{40})_x$, wherein X=0.05, 0.07 and 0.125. Here, comparisons were also prepared by setting X=0.15 and by adding 0.4 at. % of Al and Ru. When the targets prepared by that HIP method were used, the films had their compositions substantially unchanged from those of the targets even after they had been thinned. A ferrite substrate was sputtered by using these alloy targets and an Ar gas as the discharge gas. The magnetic films thus formed had a thickness of 5 μm. The sputtering conditions included a discharge gas pressure of 5 mTorr and an RF power of 400 W.

The magnetic properties and the corrosion resistance of the magnetic film thus fabricated were evaluated as in Example 1, as enumerated in Table 9.

TABLE 9

| Sample | Bs(t) | Hc(Oe) | μ | λ | CR |
|---|---|---|---|---|---|
| 1$(Fe_{78}Ta_7Si_{15})_{0.95}(Al_{70}Ru_{30})_{0.05}$ | 1.50 | 0.30 | 2300 | $6 \times 10^{-7}$ | 0 |
| 2$(Fe_{78}Ta_7Si_{15})_{0.90}(Al_{70}Ru_{30})_{0.10}$ | 1.45 | 0.30 | 2000 | $8 \times 10^{-7}$ | 0 |
| 3$(Fe_{78}Ta_7Si_{15})_{0.85}(Al_{70}Ru_{30})_{0.15}$ | 1.40 | 0.30 | 1800 | $8 \times 10^{-7}$ | 0 |
| 4$(Fe_{78}Ta_7Si_{15})_{0.95}(Al_{70}Rh_{30})_{0.05}$ | 1.50 | 0.35 | 2000 | $7 \times 10^{-7}$ | 0 |
| 5$(Fe_{78}Ta_7Si_{15})_{0.90}(Al_{70}Rh_{30})_{0.10}$ | 1.45 | 0.35 | 1800 | $9 \times 10^{-7}$ | 0 |
| 6$(Fe_{78}Ta_7Si_{15})_{0.85}(Al_{70}Rh_{30})_{0.15}$ | 1.40 | 0.35 | 1500 | $1 \times 10^{-6}$ | 0 |
| 7$(Fe_{78}Ti_7Si_{15})_{0.95}(Al_{70}Ru_{30})_{0.05}$ | 1.50 | 0.38 | 2300 | $7 \times 10^{-7}$ | 0 |
| 8$(Fe_{78}Ti_7Si_{15})_{0.90}(Al_{70}Ru_{30})_{0.10}$ | 1.45 | 0.38 | 2000 | $7 \times 10^{-7}$ | 0 |
| 9$(Fe_{78}Ti_7Si_{15})_{0.85}(Al_{70}Ru_{30})_{0.15}$ | 1.40 | 0.38 | 1800 | $8 \times 10^{-7}$ | 0 |
| 10$(Fe_{78}Zr_7Si_{15})_{0.95}(Al_{70}Ru_{30})_{0.05}$ | 1.50 | 0.38 | 2300 | $7 \times 10^{-7}$ | 0 |
| 11$(Fe_{78}Zr_7Si_{15})_{0.90}(Al_{70}Ru_{30})_{0.10}$ | 1.45 | 0.38 | 2000 | $7 \times 10^{-7}$ | 0 |

TABLE 9-continued

| Sample | Bs(t) | Hc(Oe) | $\mu$ | $\lambda$ | CR |
|---|---|---|---|---|---|
| 12$(Fe_{78}Zr_7Si_{15})_{0.85}(Al_{70}Ru_{30})_{0.15}$ | 1.40 | 0.38 | 1800 | $8 \times 10^{-7}$ | 0 |
| 13$(Fe_{78}Hf_7Si_{15})_{0.95}(Al_{70}Ru_{30})_{0.05}$ | 1.50 | 0.30 | 2300 | $6 \times 10^{-7}$ | 0 |
| 14$(Fe_{78}Hf_7Si_{15})_{0.90}(Al_{70}Ru_{30})_{0.10}$ | 1.45 | 0.30 | 2000 | $8 \times 10^{-7}$ | 0 |
| 15$(Fe_{78}Hf_7Si_{15})_{0.85}(Al_{70}Ru_{30})_{0.15}$ | 1.40 | 0.30 | 1800 | $8 \times 10^{-7}$ | 0 |
| 16$(Fe_{78}Hf_7Si_{15})_{0.95}(Al_{70}Ru_{30})_{0.05}$ | 1.50 | 0.35 | 2000 | $7 \times 10^{-7}$ | 0 |
| 17$(Fe_{78}Hf_7Si_{15})_{0.90}(Al_{70}Rh_{30})_{0.10}$ | 1.45 | 0.35 | 1800 | $9 \times 10^{-7}$ | 0 |
| 18$(Fe_{78}Hf_7Si_{15})_{0.85}(Al_{70}Rh_{30})_{0.15}$ | 1.40 | 0.35 | 1500 | $1 \times 10^{-6}$ | 0 |
| 19$(Fe_{78}Nb_7Si_{15})_{0.95}(Al_{70}Ru_{30})_{0.05}$ | 1.50 | 0.30 | 2300 | $6 \times 10^{-7}$ | 0 |
| 20$(Fe_{78}Nb_7Si_{15})_{0.90}(Al_{70}Ru_{30})_{0.10}$ | 1.45 | 0.30 | 2000 | $8 \times 10^{-7}$ | 0 |
| 21$(Fe_{78}Nb_7Si_{15})_{0.85}(Al_{70}Ru_{30})_{0.15}$ | 1.40 | 0.30 | 1800 | $8 \times 10^{-7}$ | 0 |
| 22$(Fe_{78}Nb_7Si_{15})_{0.95}(Al_{70}Rh_{30})_{0.05}$ | 1.50 | 0.35 | 2000 | $7 \times 10^{-7}$ | 0 |
| 23$(Fe_{78}Nb_7Si_{15})_{0.90}(Al_{70}Rh_{30})_{0.10}$ | 1.45 | 0.35 | 1800 | $9 \times 10^{-7}$ | 0 |
| 24$(Fe_{78}Nb_7Si_{15})_{0.85}(Al_{70}Rh_{30})_{0.15}$ | 1.40 | 0.35 | 1500 | $1 \times 10^{-6}$ | 0 |

If, on the other hand, the composition was out of the range of the present invention, the magnetic film obtained was excellent in the corrosion resistance but had magnetic properties unsuitable for the magnetic head material, as enumerated in the following Table 10.

TABLE 10

| Sample | Bs(t) | Hc(Oe) | $\mu$ | $\lambda$ | CR |
|---|---|---|---|---|---|
| 1$(Fe_{78}Ta_7Si_{15})_{0.80}(Al_{70}Ru_{30})_{0.20}$ | 1.20 | 3.50 | 800 | $2 \times 10^{-6}$ | 0 |
| 2$(Fe_{78}Ta_7Si_{15})_{0.80}(Al_{70}Rh_{30})_{0.20}$ | 1.20 | 2.80 | 700 | $4 \times 10^{-6}$ | 0 |
| 3$(Fe_{78}Ti_7Si_{15})_{0.80}(Al_{70}Ru_{30})_{0.20}$ | 1.20 | 3.50 | 800 | $2 \times 10^{-6}$ | 0 |
| 4$(Fe_{78}Zr_7Si_{15})_{0.80}(Al_{70}Ru_{30})_{0.20}$ | 1.20 | 3.50 | 800 | $2 \times 10^{-6}$ | 0 |
| 5$(Fe_{78}Hf_7Si_{15})_{0.80}(Al_{70}Ru_{30})_{0.20}$ | 1.20 | 3.50 | 800 | $2 \times 10^{-6}$ | 0 |
| 6$(Fe_{78}Nb_7Si_{15})_{0.80}(Al_{70}Ru_{30})_{0.20}$ | 1.20 | 2.80 | 800 | $4 \times 10^{-6}$ | 0 |
| 7$(Fe_{78}Nb_7Si_{15})_{0.80}(Al_{70}Ru_{30})_{0.20}$ | 1.20 | 3.80 | 800 | $2 \times 10^{-6}$ | 0 |
| 8$(Fe_{78}Nb_7Si_{15})_{0.80}(Al_{70}Ru_{30})_{0.20}$ | 1.20 | 2.80 | 800 | $4 \times 10^{-6}$ | 0 |

As apparent from Tables 9 and 10, it is found that there exists the ranges for the concentrations of added elements to retain the magnetic properties of Bs$\geq$1.4 and Hc$\geq$1.0 Oe and the corrosion resistance.

EXAMPLE 5

The magnetic film was exemplified by a Fe—Nb—B—N—Al—Ru alloy film, in which the N and B were mixed therein, and a Fe—Ta—C—Si—Al—Ru alloy film and a Fe—Hf—C—Si—Al—Ru alloy film, in which the C and Si were mixed. These magnetic films were formed by the sputtering method. The target of the sputtering method used was prepared by molding the powders of the individual elements together by hot isostatic pressing.

For forming the Fe—Nb—B—N—Al—Ru alloy film, the sputtering was effected on the substrate of single crystal ferrite by exemplifying the target by $(Fe_{80}Nb_{10}B_{15})_{0.90}$ $(Al_{80}Ru_{20})_{0.10}$ and by exemplifying the discharge gas by an Ar—N$_2$ mixture gas (having a mixture ratio: Ar/N$_2$=09/10). The sputtering conditions were the discharge gas pressure of 5 mTorr and the RF power of 400 W. The formed magnetic film had a thickness of 5 $\mu$m.

For filming the Fe—Ta—C—Si—Al—Ru alloy film, the sputtering was effected on the ferrite substrate by exemplifying the target by $(Fe_{78}Ta_7C_{10}Si_5)_{0.95}(Al_{80}Ru_{20})_{0.05}$, and by using Ar as the discharge gas. The sputtering conditions were the discharge gas pressure of 5 mTorrs and the RF power of 400 W. The formed magnetic film had a thickness of 5 $\mu$m.

The magnetic properties and the corrosion resistance of the magnetic film thus fabricated were evaluated as in Example 1, as enumerated in Table 11.

TABLE 11

| Sample | Bs(t) | Hc(Oe) | $\mu$ | $\lambda$ | CR |
|---|---|---|---|---|---|
| 1$(Fe_{78}Nb_7B_5N_{10})_{0.90}(Al_{80}Ru_{20})$0.10 | 1.45 | 0.30 | 1800 | $7 \times 10^{-7}$ | 0 |
| 2$(Fe_{78}Ta_7C_{10}Si_5)_{0.95}(Al_{80}Ru_{20})_{0.05}$ | 1.50 | 0.30 | 2000 | $8 \times 10^{-7}$ | 0 |
| 3$(Fe_{78}Hf_7C_{10}Si_5)_{0.95}(Al_{80}Ru_{20})_{0.05}$ | 1.50 | 0.22 | 2000 | $5 \times 10^{-7}$ | 0 |

As has been described in connection with Examples 1 to 5, similar effects can be achieved whatever alloys of the Fe—N, Fe—C, Fe—B and Fe—Si series might be used. Considering the fabrication process, however, the Fe—N series is weak against fluctuations in the atmospheric gas concentration but can be easily formed into the target, and the Fe—Si series is defective in its weakness against the process fluctuation. On the other hand, the Fe—N series and the Fe—C series are excellent in the thermal resistance. Thus, generally considering the Fe—N series and the Fe—C series are the most excellent.

Since the deterioration of the saturation magnetization and the soft magnetic properties can be remarkably suppressed by adding (Al, Ru) or (Al, Rh) together more than the case, in which the Al, Ru or Rh is solely added, it is possible to provide a magnetic film which has a high corrosion resistance while keeping a high performance as the magnetic head. By using the magnetic film of the present invention, it is possible to provide not only a magnetic head having a high performance and a high reliability but also a magnetic recording device having these performance advantages.

The present invention will now be described in detail in connection with the following examples, examples 6–10 directed to a magnetic film formed according to the second embodiment of the invention.

EXAMPLE 6

A magnetic film was prepared by using a high-frequency dipolar sputtering device. The sputtering conditions were as follows:

Sputter Gas: Ar or Ar—N$_2$

Sputtering Gas Pressure: 0.66 Pa

High-Frequency Power: 400 W

Distance between Target and Substrate: 50 mm

Substrate Temperature: 50° to 100° C. (Water-Cooled)

In this Example, films of various compositions were formed by using the composite target which was prepared by adhering a chip of an added element to an Fe target. The concentration of N, if added, was varied by controlling the ratio of $N_2$ in the sputtering gas. The substrate was made of crystalline glass having a diameter of 10 mm, and the magnetic film had a thickness of about 2 μm. The film was subjected, after being formed, to a heat treatment in an Ar gas atmosphere at 575° C. for 1 hour. The magnetic properties were measured, and the corrosion resistance was tested. The magnetic film had its composition measured by the EPMA method, its saturation magnetization measured by the sample vibration type magnetic flux meter (VSM), its corrosion resistance measured by the B-H curve tracer and the VSM, its magnetostriction constant measured by the optical lever method, and its permeability measured by the figure "8" coil method. Moreover, the corrosion resistance was evaluated by dipping the sample in an aqueous solution of NaCl of 0.5N and by measuring the time period from the dip to the start of the corrosion as the corrosion resistance time. Incidentally, the start of the corrosion was judged by observing an optical microscope from the instant when the ratio of the area of the corroded portion to the surface area of the sample exceeds 0.1 at. %. The results are enumerated in Table 12.

Cr or Al, have their corrosion resistance values improved to have no corrosion even if they were dipped for 100 hours, but have their saturation magnetization much reduced to less than 1.3 T and their magnetostriction constants increased to as high as 5 to $8 \times 10^{-6}$.

According to this Example, it was possible to form the magnetic films, as designated by Sample Nos. 1 to 12, which had their corrosion resistance values improved to not less than 10 hours by adding Ru, Rh, Ir, Os, Pd or Pt, their magnetostriction constants of no more than $4 \times 10^{-6}$, in most cases, no more than $2 \times 10^{-6}$, in absolute values by adding Si, and their saturation magnetization values of no less than 1.3 T.

It is also found from Table 12 that the element Ru, Rh, Ir or Os of the group consisting of Ru, Rh, Ir, Os, Pd and Pt was more effective for improving the corrosion resistance than the element Pd or Pt.

In case, on the other hand, the Si concentration was less than 5 at. % as in the Sample Nos. 13 to 15, the effect of reducing the magnetostriction constant was low. In the case of the Si concentration exceeding 20 at. %, the saturation magnetization was low, as low as less than 1.3 T. In the case of the addition of Ru in excess of 15 at. % (Sample no. 15),

TABLE 12

| Samp. No. | Ref. No. | Composition of Magnetic Film (at. %) | Saturation Magnetization (T) | Coercive Force (Oe) | Magnetostriction Const. ($\times 10^{-6}$) | Corrosion Resistance Time (hours) |
|---|---|---|---|---|---|---|
| | 1 | $Fe_{76}Ta_{11}C_{13}$ | 1.53 | 0.3 | −0.7 | 0.1 |
| | 2 | $Fe_{78}Zr_{10}N_{12}$ | 1.55 | 0.4 | −0.3 | 0.1 |
| | 3 | $Fe_{80}Hf_9C_{11}$ | 1.60 | 0.4 | 0.3 | 0.1 |
| | 4 | $Fe_{74}Zr_{10}N_{11}Cr_5$ | 1.42 | 0.3 | 1.8 | 1 |
| | 5 | $Fe_{68}Ta_{10}C_{11}Cr_{11}$ | 1.18 | 0.8 | 5.0 | >100 |
| | 6 | $Fe_{67}Ta_{10}C_{12}Al_{11}$ | 1.22 | 0.3 | 8.0 | >100 |
| 1 | | $Fe_{69.7}Ta_{7.7}C_{8.6}Si_{11.0}Ru_{3.0}$ | 1.31 | 0.6 | 0.5 | 80 |
| 2 | | $Fe_{73.7}Hf_{3.0}C_{5.1}Si_{12.0}Ru_{6.2}$ | 1.49 | 0.9 | 1.0 | >100 |
| 3 | | $Fe_{68.0}Ta_{7.6}C_{8.4}Si_{10.5}Rh_{5.5}$ | 1.52 | 0.4 | 2.7 | >100 |
| 4 | | $Fe_{68.9}Zr_{7.8}N_{8.6}Si_{11.5}Ru_{3.2}$ | 1.30 | 0.6 | −0.5 | 90 |
| 5 | | $Fe_{74.4}Hf_{3.5}C_{5.6}Si_{12.0}Rh_{4.5}$ | 1.57 | 0.4 | 1.3 | >100 |
| 6 | | $Fe_{68.0}Ta_{7.5}C_{8.3}Si_{11.6}Ir_{4.6}$ | 1.48 | 0.5 | 0.7 | 80 |
| 7 | | $Fe_{75.4}Hf_{3.4}N_{5.5}Si_{9.5}Os_{6.2}$ | 1.51 | 0.8 | 1.3 | 70 |
| 8 | | $Fe_{62.4}Zr_{6.9}N_{7.7}Si_{11.0}Pd_{12.0}$ | 1.53 | 0.7 | 2.3 | 50 |
| 9 | | $Fe_{73.1}Hf_{4.5}C_{6.4}Si_{12.5}Pt_{3.5}$ | 1.54 | 0.9 | 3.0 | 20 |
| 10 | | $Fe_{67.8}Ta_{5.2}Nb_{2.5}C_{8.5}Si_{10.6}Rh_{5.4}$ | 1.50 | 0.5 | 2.5 | >100 |
| 11 | | $Fe_{69.0}Zr_{5.3}W_{2.5}C_{8.6}Si_{11.2}Ru_{3.4}$ | 1.32 | 0.6 | 0.5 | 95 |
| 12 | | $Fe_{72.4}Hf_{3.4}Mo_{2.0}C_{5.7}Si_{12.0}Rh4.5$ | 1.53 | 0.5 | 1.0 | >100 |
| 13 | | $Fe_{76.7}Ta_{7.7}C_{8.6}Si_{4.0}Ru_{3.0}$ | 1.55 | 0.6 | 8.5 | 60 |
| 14 | | $Fe_{56.5}Ta_{7.6}C_{8.4}Si_{22.0}Rh_{5.5}$ | 1.05 | 1.5 | −4.3 | >100 |
| 15 | | $Fe_{61.9}Hf_{3.0}C_{5.1}Si_{12.0}Ru_{18.0}$ | 0.93 | 5.5 | 4.5 | >100 |

As seen from Table 12, the FeTaC, FeZrN and FeHfC magnetic films of References 1 to 3 exhibit such excellent magnetic properties that the saturation magnetization is as high as 1.6 to 1.6 T, whereas the coercive force and the magnetostriction constant are small. However, the corrosion resistance time when the References were dipped in the solution of NaCl of 0.5N is as short as 0.1 h. and is liable to corrode, and the References are troubled by the corrosion resistance. On the other hand, the sample of Reference 4, to which was added the Cr so as to improve the corrosion resistance of those magnetic films, is effective for improving the corrosion resistance but is not sufficient. The samples of References 5 and 6, to which was added a large amount of the magnetostriction constant exceeded $4 \times 10^{-6}$, and the saturation magnetization dropped to less than 1.3 T.

EXAMPLE 7

By the process similar to that of Example 1, the samples were prepared by simultaneously adding at least one element selected from the group consisting of Ru, Rh, Ir, Os, Pd and Pt, at least one element of Cr and Al, and Si, and their magnetic properties and corrosion resistance values were examined. The results are enumerated in Table 13.

TABLE 13

| Samp. No. | Composition of Magnetic Film (at. %) | Saturation Magnetization (T) | Coercive Force (Oe) | Magnetostriction Const. ($\times 10^{-6}$) | Corrosion Resistance Time (hours) |
|---|---|---|---|---|---|
| 16 | $Fe_{68.7}Ta_{6.5}C_{7.3}Si_{11.5}Rh_{3.5}Al_{2.5}$ | 1.43 | 0.6 | 1.5 | >100 |
| 17 | $Fe_{66.7}Zr_{6.5}N_{8.1}Si_{12.2}Rh_{3.5}Cr_{3.0}$ | 1.35 | 0.3 | 0.8 | >100 |
| 18 | $Fe_{73.7}Hf_{3.0}C_{5.1}Si_{12.0}Ru_{1.2}Cr_{5.0}$ | 1.42 | 0.4 | 1.2 | >100 |
| 19 | $Fe_{68.0}Ta_{7.5}C_{8.3}Si_{11.6}Ir_{2.6}Al_{2.0}$ | 1.43 | 0.4 | 0.5 | 95 |
| 20 | $Fe_{70.4}Hf_{3.4}N_{5.5}Si_{9.5}Pd_{0.7}Al_{10.5}$ | 1.38 | 0.5 | 2.3 | >100 |
| 21 | $Fe_{62.7}Hf_{3.0}C_{5.1}Si_{12.0}Ru_{1.2}Cr_{16.0}$ | 1.02 | 2.4 | 7.2 | >100 |
| 22 | $Fe_{63.9}Hf_{3.4}N_{5.5}Si_{9.5}Pd_{0.7}Al_{17.0}$ | 1.08 | 1.5 | 6.3 | >100 |

The samples of Nos. 16 to 20 were prepared by simultaneously adding at least one element selected from the group consisting of Ru, Rh, Ir, Os, Pd and Pt, AND at least one element of Cr and Al, and Si. As seen from Table 13, the magnetic films thus formed had their corrosion resistance values improved to show corrosion resistance time periods of 10 hours or longer, the magnetostriction constants reduced to no more than $4\times10^{-6}$, in their absolute values and in most cases no more than $2\times10^{-6}$, and the saturation magnetization increased to no less than 1.3 T.

In the samples of Nos. 21 and 22 containing Cr or Al in excess of 15 at. %, on the other hand, the saturation magnetization was less than 1.3 T, and the magnetostriction constant exceeded $4\times10^{-6}$.

EXAMPLE 8

By the process similar to that of Example 1, the samples were prepared by simultaneously adding at least one element selected from the group consisting of Ru, Rh, Ir, Os, Pd and Pt, at least one element of Ni and Co, and Si, and their magnetic properties and corrosion resistance values were examined. The results are enumerated in Table 14.

TABLE 14

| Samp. No. | Composition of Magnetic Film (at. %) | Saturation Magnetization (T) | Coercive Force (Oe) | Magnetostriction Const. ($\times 10^{-6}$) | Corrosion Resistance Time (hours) |
|---|---|---|---|---|---|
| 23 | $Fe_{66.8}Hf_{3.5}C_{6.2}Si_{13.0}Ru_{7.5}Co_{3.0}$ | 1.41 | 0.9 | 3.5 | >100 |
| 24 | $Fe_{65.6}Nb_{7.3}C_{8.1}Si_{12.8}Rh_{4.2}Ni_{2.0}$ | 1.48 | 0.4 | 0.7 | >100 |
| 25 | $Fe_{68.2}Ta_{7.7}C_{8.6}Si_{11.0}Ru_{3.0}Co_{1.5}$ | 1.41 | 0.6 | 1.5 | 85 |
| 26 | $Fe_{68.0}Ta_{7.5}C_{8.3}Si_{11.6}Ir_{1.1}Ni_{3.5}$ | 1.48 | 0.5 | 0.9 | 90 |
| 27 | $Fe_{62.4}Zr_{6.9}N_{7.7}Si_{11.0}Pd_{2.0}Ni_{10.0}$ | 1.55 | 0.5 | 2.8 | 90 |
| 28 | $Fe_{52.8}Hf_{3.5}C_{6.2}Si_{13.0}Ru_{7.5}Co_{17.0}$ | 1.53 | 5.9 | 18.5 | >100 |
| 29 | $Fe_{56.4}Zr_{6.9}N_{7.7}Si_{11.0}Pd_{2.0}Ni_{16.0}$ | 1.45 | 1.5 | 8.8 | >100 |

The samples of Nos. 23 to 27 were prepared by simultaneously adding at least one element selected from the group consisting of Ru, Rh, Ir, Os, Pd and Pt, and at least one element of Ni and Co, and Si. As seen from Table 14, the magnetic films thus formed had their corrosion resistance values improved to exhibit corrosion resistance time periods of 10 hours or longer, a magnetostriction constant reduced to no more than $4\times10^{-6}$, in their absolute values, in most cases no more than $2\times10^{-6}$, and a saturation magnetization increased to no less than 1.3 T.

In the samples of Nos. 28 and 29 containing Co or Ni in excess of 15 at. %, on the other hand, the magnetostriction constant greatly increased to exceed $4\times10^{-6}$.

EXAMPLE 9

By the process similar to that of Example 1, the samples were prepared by simultaneously adding at least one element selected from the group consisting of Ru, Rh, Ir, Os, Pd and Pt, at least one element of Ni and Co, at least one element of Cr and Al, and Si, and their magnetic properties and corrosion resistance values were examined. The results are enumerated in Table 15.

TABLE 15

| Samp. No. | Composition of Magnetic Film (at. %) | Saturation Magnetization (T) | Coercive Force (Oe) | Magnetostriction Const. ($\times 10^{-6}$) | Corrosion Resistance Time (hours) |
|---|---|---|---|---|---|
| 30 | $Fe_{70.9}Hf_{3.4}N_{5.1}Si_{13.0}Ru_{3.6}Ni_{2.0}Al_{2.0}$ | 1.45 | 0.5 | 1.5 | >100 |
| 31 | $Fe_{66.8}Hf_{3.5}C_{6.2}Si_{13.0}Ru_{3.5}Co_{3.0}Al_{4.0}$ | 1.42 | 0.4 | 3.6 | >100 |
| 32 | $Fe_{65.6}Nb_{7.3}C_{8.1}Si_{12.8}Rh_{3.2}Ni_{2.0}Cr_{1.0}$ | 1.45 | 0.4 | 0.2 | >100 |
| 33 | $Fe_{62.4}Zr_{6.9}N_{7.7}Si_{11.0}Pd_{2.6}Ni_{5.0}Al_{5.0}$ | 1.38 | 0.3 | 2.5 | >100 |

TABLE 15-continued

| Samp. No. | Composition of Magnetic Film (at. %) | Saturation Magnetization (T) | Coercive Force (Oe) | Magnetostriction Const. ($\times 10^{-6}$) | Corrosion Resistance Time (hours) |
|---|---|---|---|---|---|
| 34 | $Fe_{68.7}Ta_{6.5}C_{7.3}Si_{11.5}Rh_{2.0}Co_{1.5}Al_{2.5}$ | 1.43 | 0.5 | 1.3 | 95 |
| 35 | $Fe_{58.4}Zr_{6.9}N_{7.7}Si_{11.0}Pd_{2.0}Ni_{7.0}Al_{7.0}$ | 1.32 | 1.3 | 8.5 | >100 |

The samples of Nos. 30 to 34 were prepared by simultaneously adding at least one element selected from the group consisting of Ru, Rh, Ir, Os, Pd and Pt, at least one element of Ni and Co, at least one element of Al and Cr, and Si. As seen from Table 15, the magnetic films thus formed had their corrosion resistance values improved to have a corrosion resistance time period of 10 hours or longer, the magnetostriction constants reduced to no more than $4\times10^{-6}$, in their absolute values, in most cases no more than $2\times10^{-6}$, and the saturation magnetization increased to no less than 1.3 T.

In the sample of No. 35 containing Pd as the element of group X, Al as the element of group Y and Ni as the element of group M, wherein their sum is in excess of 15 at. %, the magnetostriction constant is greatly increased to exceed $4\times10^{-6}$.

The aforementioned samples of Nos. 1 to 12, 16 to 20, 23 to 27 and 30 to 34 were observed by an X-ray diffraction and a transmission electronic microscope. The results revealed that each of the magnetic films was constructed of: small crystal grains composed mainly of Fe; and a chemical compound existing around the crystal grains and composed of the element group T of Zr, Hf, Ta and Nb and the element group Z of C and N. The crystal grains composed mainly of Fe had an average diameter of 10 to 20 nm, and the nitrides and carbides had a crystal grain diameter of 3 to 8 nm.

As clarified in the foregoing individual Examples, the magnetic films according to the present invention are excellent in their magnetic properties such as saturation magnetization and/or coercive force and in their corrosion resistance so that they are suitable for use as a core material of a magnetic head of a VTR and a magnetic disc, for example.

EXAMPLE 10

Figure 2:
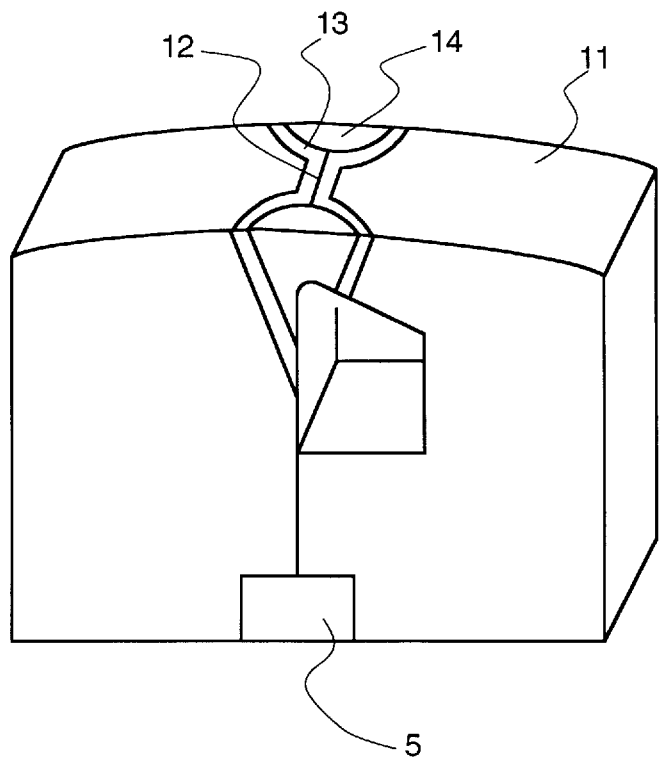
FIG. 2 is a view showing a construction of the magnetic head.
Figure 3:
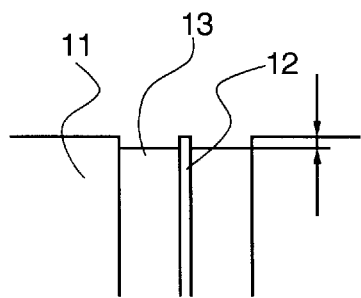
FIG. 3 is a diagram illustrating the step on the tape sliding face between the ferrite substrate and the magnetic film.

The magnetic film of the present invention was used, as shown in FIG. 2, to form a magnetic film 13 in the vicinity of a gap 12 of a ferrite head or the so-called "MIG type head" to be used in a ferrite substrate 11. The magnetic film 13 had a thickness of 5 μm. Reference numerals 14 and 15 designate low-melting bonding glasses. When the magnetic tape slides on the magnetic head being used, a step d is established due to the difference in the wearing rate of the material, as shown in FIG. 3, between the ferrite 11 and the magnetic film 13. As a result, a spacing loss is caused that reduces the output in the high-frequency range. In these heads, a metal tape having a corrosion resistance of 1,500 Oe run at a relative speed relative speed of 3.75 m/s for 1 hour, and the step d between the ferrite substrate 11 and the magnetic film 13 and the recording/reading outputs at 7 MHz were measured. The results are enumerated in Table 16.

TABLE 16

| Samp. No. Inv. | Ref. No. | Composition of Magnetic Film (at. %) | Output (dB) | Step between Ferrite and Magnetic Film (μm) |
|---|---|---|---|---|
| | 1 | $Fe_{68.9}Zr_{7.8}N_{8.6}Si_{11.5}Ru_{3.2}$ | 0 | 0.035 |
| 1 | | $Fe_{68.9}Zr_{7.8}N_{8.6}Si_{11.5}Ru_{3.2}$ | +2.5 | 0.016 |
| 2 | | $Fe_{74.4}Hf_{3.5}C_{5.6}Si_{12.0}Rh_{4.5}$ | +3.0 | 0.013 |
| 3 | | $Fe_{68.7}Ta_{6.5}C_{7.3}Si_{11.5}Rh_{3.5}Al_{2.5}$ | +3.5 | 0.011 |

As seen from Table 16, the magnetic head using the magnetic film of the present invention has a smaller step d between the ferrite 11 and the magnetic film 13 than that of the reference (prior art) so that the recording/reading outputs are highly improved. This is because the magnetic film of the present invention has an excellent corrosion resistance so that its hardness is greatly improved.

By using the magnetic films of the embodiments of the present invention, a highly reliable magnetic recording device having a magnetic head which is excellent in corrosion resistance and hardness and which has less deterioration in the recording/reading outputs while being used. An example of such a magnetic recording is described with reference to FIG. 4.

Figure 4:
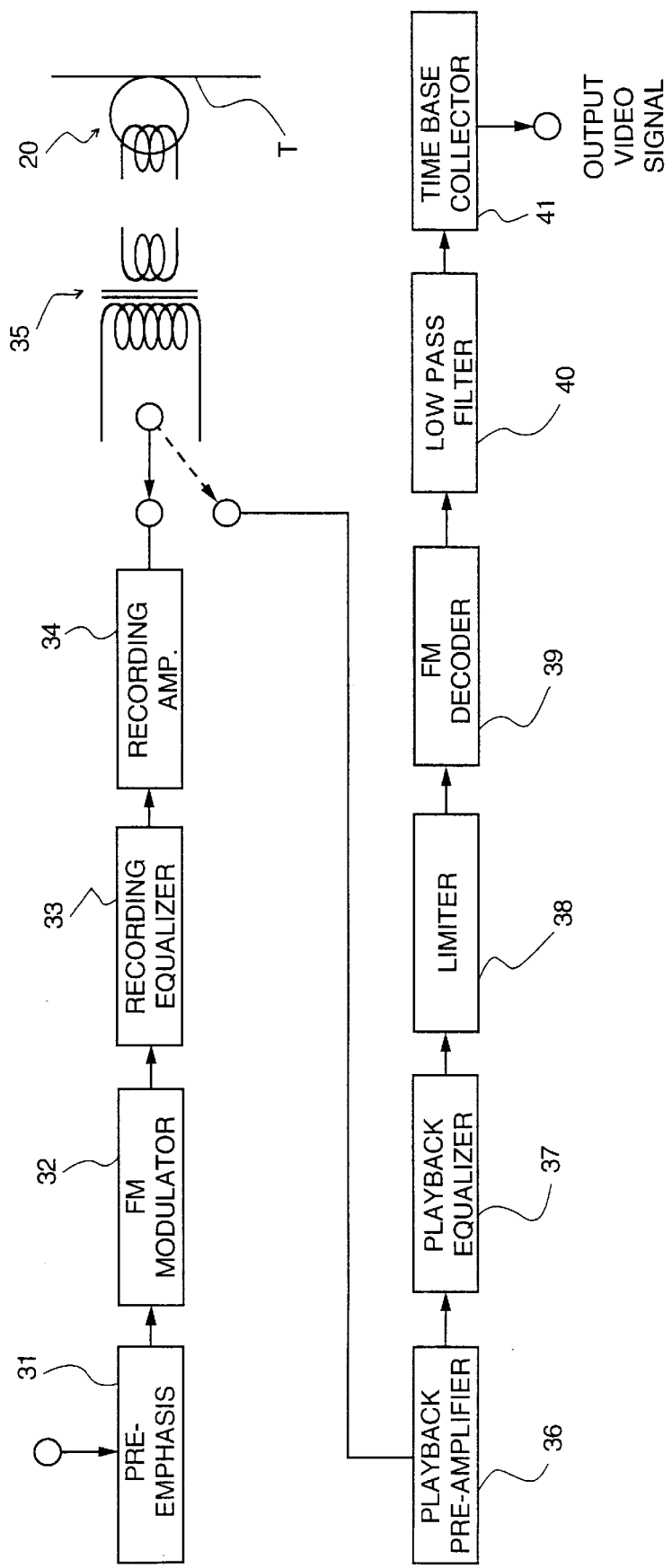
FIG. 4 is an example of a diagram of a video recording/playback unit having a magnetic head and using magnetic tape formed from the magnetic film of the present invention.

FIG. 4 shows a diagram of a VTR device that includes a magnetic head 20 that can have a core manufactured using the magnetic films of the present invention and a magnetic tape T, also preferably formed using the magnetic films of the present invention. The VTR device that is shown in FIG. 4 is merely one example of a magnetic recording unit to which the invention can be applied. In this regard, the magnetic head is preferably an inductive type magnetic head primarily used for a VTR, but other magnetic recording applications are also possible according to the present invention.

In the VTR example shown in FIG. 4, a video signal is input to a pre-emphasis circuit 31 that is connected to an FM modulator 32, which is in turn connected to a recording equalizer 33 and a recording amplifier 34. These elements constitute the recording circuit of the VTR. The playback circuit includes a playback pre-amplifier 36 that is connected to a playback equalizer 37, a limiter 38, an FM decoder 39, a low pass filter 40 and a time base collector 41, which outputs the video signal. A rotational transformer 35 is used with magnetic head 20 in the recording and playback operations as is known in the conventional manner for a VTR device.

As a result of using the magnetic film of the embodiments of the invention, the operational reliability of the device is enhanced, especially when operating in an atmosphere in which it is exposed to corrosion potential, e.g., in a high humidity atmosphere or one in which corrosive substances such as chloride are present.

As described in detail hereinbefore, the magnetic film according to the present invention has not only excellent soft magnetic properties in the high saturation magnetization, the low coercive force and the low magnetostriction constant but also a high corrosion resistance and a high hardness. By using the magnetic film in the magnetic head core, it is possible to provide a magnetic head and a magnetic recording device which have the excellent recording/reading characteristics and reliability.

We claim:

1. A soft magnetic thin film comprising a composition with a general formula of $Fe_aT_bZ_cAl_dX_e$, wherein T is at least one element selected from the group consisting of Ta, Zr, Hf, Ti and Nb; Z is at least one element selected from the group consisting of C, B and Si; and X is at least one element selected from the group consisting of Ru or Rh; in that said composition has a ratio of a, b, c, d and e which satisfies a relation expressed by the following equations: $5 \leq b \leq 20$, $1 \leq c \leq 20, 0.5 \leq d \leq 10, 0.5 \leq e \leq 5$, $1 \leq (d+e) \leq 15$ and a+b+c+d+e=100, wherein a, b, c, d and e are atomic percentages.

2. A soft magnetic thin film as set forth in claim 1, wherein said element Al has a concentration within a range of $0.5 \leq d \leq 8$.

3. A soft magnetic thin film as set forth in claim 1 or 2, wherein said element Al and said element X have a concentration sum within a range of $3 \leq (d+e) \leq 15$.

4. A soft magnetic thin film as set forth in claim 2, wherein a concentration ratio of Al/Ru or Al/Rh, as expressed in a ratio of (d/e) is within 1 to 5.

5. A soft magnetic thin film as set forth claim 1, wherein said film has a saturation magnetization of no less than 1.4 T, a coercive force of no more than 1oe, a relative permeability of no less than 1,000 and magnetostriction constant of n more than $5 \times 10^{-6}$.

6. A soft magnetic thin film as set forth in claim 1, wherein said film is thermally treated for crystals to separate our thereby to have diffraction peak in an X-ray; and wherein crystal granules of the crystals in the Fe phase have an average size of no more than 10 nm.

7. A soft magnetic thin film as set forth in claim 1, wherein crystals in an Fe phase and crystals in a carbonate phase, a nitride phase or a boride phase separate out so that most of the Al and Rh or Ru is in a solid solution in the Fe phase.

8. A magnetic head having a magnetic head core, said magnetic core having at least one portion thereof formed of said magnetic film as set forth in claim 1.

9. A magnetic head as set forth in claim 8, wherein said head is a metal-in-gap type magnetic head.

10. A magnetic recording unit including a moving magnetic recording medium that is recorded with information by using a magnetic head having at least one portion thereof formed of said magnetic film as set forth in claim 1.

11. A magnetic recording unit as set forth in claim 10, characterized by recording video information and/or audio information.

12. A magnetic recording unit as set forth in claim 10, characterized in that a magnetic tape or disc formed thereon with magnetically recording medium layer is used as an information recording medium.

13. A soft magnetic thin film according to claim 1 wherein said composition has a general formula of $(Fe_{75}Ta_{10}C_{15})$ 1-x $(Al_{60}Ru_{40})$ x, wherein $0.05 \leq x \leq 0.125$.

14. A soft magnetic thin film as set forth in claim 13, wherein said element Al has a concentrating within a range of $0.5 \leq d \leq 8$.

15. A soft magnetic thin film as set forth in claim 13, wherein said element Al and said element Ru have a concentration sum within a range of $3 \leq (d+e) \leq 15$.

16. A magnetic head having at least one portion thereof formed of said magnetic film as set forth in claim 13, wherein said head is a metal-in-gap type magnetic head.

* * * * *